(12) United States Patent
Altieri

(10) Patent No.: US 11,164,145 B2
(45) Date of Patent: Nov. 2, 2021

(54) APPARATUS AND METHOD OF IDENTIFYING AND SIZING CLOTHING IN AN INVENTORY MANAGEMENT SYSTEM

(71) Applicant: Frances Barbaro Altieri, Belmont, MA (US)

(72) Inventor: Frances Barbaro Altieri, Belmont, MA (US)

(*) Notice: Subject to any disclaimer, the term of this patent is extended or adjusted under 35 U.S.C. 154(b) by 110 days.

(21) Appl. No.: 16/397,474

(22) Filed: Apr. 29, 2019

(65) Prior Publication Data

US 2019/0251500 A1 Aug. 15, 2019

Related U.S. Application Data

(62) Division of application No. 14/471,589, filed on Aug. 28, 2014, now Pat. No. 10,318,916.

(60) Provisional application No. 61/871,055, filed on Aug. 28, 2013.

(51) Int. Cl.
*G06Q 10/00* (2012.01)
*G06Q 10/08* (2012.01)
*B25J 11/00* (2006.01)

(52) U.S. Cl.
CPC ............ *G06Q 10/087* (2013.01); *B25J 11/00* (2013.01)

(58) Field of Classification Search
CPC .............................. G06Q 10/087; G06Q 20/00
USPC .................................................... 705/16, 28
See application file for complete search history.

(56) References Cited

U.S. PATENT DOCUMENTS

| | | |
|---|---|---|
| 6,665,577 B2 | 12/2003 | Onyshkevych et al. |
| 6,907,310 B2 | 6/2005 | Gardner et al. |
| 7,020,538 B2 | 3/2006 | Luhnow |
| 7,092,782 B2 | 8/2006 | Lee |
| 7,146,239 B2 | 12/2006 | Loeb |
| 7,398,133 B2 | 7/2008 | Wannier et al. |
| 7,577,583 B2 | 8/2009 | Litke et al. |
| 7,657,341 B2 | 2/2010 | Lind |
| 8,175,931 B2 | 5/2012 | Harvill et al. |
| 8,660,902 B2 | 2/2014 | Coulter |
| 8,700,477 B2 | 4/2014 | Wolper et al. |
| 2009/0193675 A1 | 8/2009 | Sieber |
| 2011/0022965 A1* | 1/2011 | Lawrence ............... G06F 3/011 715/747 |
| 2011/0078055 A1 | 3/2011 | Faribault et al. |
| 2012/0016518 A1 | 1/2012 | Saario et al. |
| 2014/0176565 A1 | 6/2014 | Adeyoola et al. |

(Continued)

OTHER PUBLICATIONS

Non-Final Office Action issue in U.S. Appl. No. 14/471,589 dated May 17, 2018.

(Continued)

*Primary Examiner* — Rokib Masud
(74) *Attorney, Agent, or Firm* — Jean C. Edwards, Esq.; Edwards Neils LLC

(57) ABSTRACT

The present invention relates to a method of sizing merchandise in a virtual environment, including receiving and storing in a database, measurements from sensors in one of a body covering or from an image capturing device which captures images of a body and creates an avatar with the measurements; processing the measurements to obtain sizing; and utilizing the measurements from the body covering or the avatar, to obtain the merchandise with the sizing.

6 Claims, 21 Drawing Sheets

(56) References Cited

U.S. PATENT DOCUMENTS

2014/0348417 A1* 11/2014 Moore ................ A61B 5/1075
  382/154
2017/0124547 A1 5/2017 Natarajan et al.

OTHER PUBLICATIONS

Final Office Action issue in U.S. Appl. No. 14/471,589 dated Oct. 9, 2018.

* cited by examiner

APPARATUS AND METHOD OF IDENTIFYING AND SIZING CLOTHING IN AN INVENTORY MANAGEMENT SYSTEM

CROSS-REFERENCE TO RELATED APPLICATIONS

The present application is a Divisional Application of U.S. patent application Ser. No. 14/471,589, filed Aug. 28, 2014, which claims the benefit of U.S. Provisional Patent Application No. 61/871,055, filed Aug. 28, 2013, the contents of both of which are herein incorporated by reference in its entirety.

BACKGROUND OF THE INVENTION

1. Field of the Invention

The present invention relates to an electronic apparatus, including, but not limited to a cell phone, remote control, liquid crystal display (LCD) panel, intelligent sensors, etc., and method, included in and/or which assist in the process of managing an inventory, including a virtual closet, storefront, or virtual environment, and to a method of sizing goods from the point of manufacturing the goods to the point of inventory and sales. The present invention further encompasses the tracking, stamping, security, and measurement of the goods, as well as the cutting and sewing of the merchandise, including the equipment required to manufacture clothing, footwear, and other types of goods.

2. Description of Related Art

Virtual environments and three dimensional (3D) rendering of images, clothing, merchandise, are becoming the mainstream. Capturing and rendering the images into 3D have assisted individuals, merchandisers, and manufacturers to populate web sites and virtual environments. Several companies are able to capture the images and convert them from two dimensional (2D) to 3D, but have difficulty in sizing objects especially for those who purchase clothing. Some inventions have used patterns for sizing, while others capture the images and calculate the sizes by converting them to 3D, using mathematical algorithms afterwards to interpret the individual sizes. Others allow you to shop from home by using a gaming device, lighting and cameras, which are used to view the merchandise online on the same device.

However despite these technologies, being able to actually size goods from the point of manufacturing has not been investigated, as well as being able to track and size the merchandise on the person's virtual body using exact measurements, nor shopping from the person's home via a virtual system, environment, or closet.

Another feature that has not been investigated is the ability to integrate tracking mechanisms during the manufacturing process for security, inventory tagging, and managing the specifications of that merchandise during and after the manufacturing process in an inventory system. Current methods and systems also do not have the ability to store the images directly as 2D, 3D, 4D and other formats, which are needed for different types of internet applications and environments. Thus, an apparatus which could overcome these deficiencies, is desired.

SUMMARY OF THE INVENTION

The present invention is directed to an apparatus and method for sizing merchandise on a person's virtual body, in order to purchase goods that will fit the individual's body at the time of capturing the person's physical measurements. The present invention also includes an apparatus and method for the collection, conversion, storage, tagging, and integration of a live inventory system, to view, track, and purchase goods from a virtual closet, mirror, environment or device, to track the goods via global positioning system (GPS) and satellite, as well as the addition of radio frequency identification (RFID), metallic thread, metallic inks, specialty inks, barcodes, intelligent sensors, or other types of security for tracking components of the merchandise as it is being manufactured.

The present invention tracks the sizing of the merchandise as it is being manufactured by capturing, storing, and submitting the data to an application or system for rendering, and merging data for each and every piece of merchandise. Thus, anyone who is designing and manufacturing goods has the ability to manage the goods and merchandise being manufactured, as well as anyone who wants to purchase the goods, now has a system that allows them to try on the merchandise from a virtual environment.

The present invention utilizes a quantum imaging environment (QIE) engine, which manages different types of input: 2D, 3D, Holographic, Video, Voice, and other types of input processing of information, and outputs the data to different storage devices, computer screens, holographic globes, cell phones, personal digital assistants (PDAs), any type of box, digital device, intelligent sensor, projection, or virtual environment. The present invention also supports the development of a wand, technical box, or other device that calculates and maintains all of the measurements by component, and then embeds this data into a label, ink, bar code, specialty thread for sizing purposes, security and tracking, as well for containing the description of the goods and inventory.

In one embodiment, the user may be shopping online or in a virtual environment either from their virtual closet, computer environment, cell phone, or in a physical store location and browse for goods that are sorted by vendor, price, style, cut, size, and/or a combination of the elements.

In one embodiment, the user is exposed to a virtual street view of a city and is able to enter any virtual store displaying only the merchandise requested by the user by designer/maker, size, color, and any other attributes selected or requested by the user to view and purchase goods.

In one embodiment, the user is exposed to a personal catalog of the goods requested, or selected by the user for viewing and purchasing of goods.

In one embodiment, the user creates an avatar of the user by exposing their image to an image capturing device or set of devices embedded either in a closet, mirror, stand, store, screen or any other area that the image capturing device is located and can be activated. The size of the avatar is calculated as the image capturing device and/or devices scans the user's body to calculate their measurements.

In one embodiment the user searches and matches clothing using the measurements calculated for the avatar, and locates merchandise containing the calculated measurements that were captured and stored in each piece of merchandise from the manufacturing process to inventory.

In one embodiment, the image capturing device is embedded in a sewing machine, blow molding device, cutting machine, or any other equipment used in the manufacturing of clothing, footwear or any type of merchandise or goods including furniture, home goods, etc.

In one embodiment, one or more intelligent sensors are embedded in a sewing machine, blow molding device, cutting machine, or box attached to any of the equipment and/or and any other equipment used in the manufacturing of clothing, footwear, or goods.

In one embodiment the intelligent sensors and/or image capturing device capture all data as the goods are being manufactured in a sewing machine, cutting machine, blow molding device, and any other equipment used in the manufacturing of clothing, footwear, or goods, and stores all the data into a storage medium for further use.

In one embodiment the intelligent sensors and/or capturing device capture all data as the goods are being manufactured and store the information into a drive or storage medium or device that produces a bar code, transfers the data to electronic memory thread, ink, RFID chip or other type of digital marking that can be embedded, sewn, glued, or permanently applied to the clothing, footwear, or goods containing the information captured, as the merchandise was being developed for the size, or specification of that particular piece of merchandise, which is further provided a unique identification (ID) for security purposes.

In one embodiment the information is translated from one language to another, in the language specified by the individual, or by the designer, to the individuals cutting, sewing, producing, manufacturing, the merchandise, goods, apparel, footwear, etc., as well as those who are purchasing goods from a foreign country, or a storefront owner/sales person who does not speak the language understood by the user.

In one embodiment the user can use voice commands, written commands, touch screen or other type of intelligent sensory activity, including brain interface/mind control, to instruct or activate the equipment for purposes of finding the goods by vendor, size, color, shape, specification, price, location, etc. The images may be in the form of 2D, 3D, 4D, 5D, video, or any other type of format required or searched.

In one embodiment the intelligent sensors provide information that is transmitted to a dashboard, cell phone, PDA, controller board, computer screen or other digital device displaying any equipment failure, number of products produced, any fault in production, and downtime and other relevant information.

In one embodiment a conveyor belt moves product, the conveyor belt system which contains a combination of intelligent sensors, a robot and/or robotic arm(s), clothes bin, and a control panel which measures the completed merchandise, attaches a label, RFID chip, bar code, ink, thread or other type of technology containing the size of the final product.

In one embodiment a clothing box or wand containing different types of components, chip, and communication link, captures the size of each manufactured piece, calculating the measurements, and transmitting this information to a labeling device, electronic arm-producing ink, labels, or embedding RFID chips, disks, removal disks, USB, or other devices to transfer the devices' data to a separate labeling, RFID chip-embedding equipment, or bar code type of printing device or to a separate RFID chip.

In one embodiment a sock, stocking, slipper, or some type of foot covering made up of stretchable, breathable material that contains specialty threaded sensors, or threads, etc., when placed onto the foot and ankle, captures the measurement of the foot and ankle and transmits this information via a wireless connection to a hard disk, mini disk, portable disk, application for processing.

In one embodiment a piece of clothing covering the entire body, part of the body, made up of a stretchable breathable material that contains specialty threaded sensors, or threads, etc., when placed onto the body, will mold to the body and form and capture the person's size in each area such as the upper arms, wrist, ankles, legs, upper torso, etc. The threads and/or intelligent sensors will capture the person's measurements and transmit this information to the online system for further processing.

In one embodiment, a method of identifying merchandise in an inventory system, includes: receiving and storing a design in a database of a computer system; developing a pattern from the design and storing the pattern in the database; sending the pattern to a cutting or pattern device, to cut a material for manufacture of the merchandise; capturing and storing images from the cut of the material for the merchandise using an image capturing device, to obtain pattern information and measurements; sending the captured images, pattern information and measurements, to an enterprise resource planning system for manufacture and processing; embedding a unique identification into each piece of merchandise during manufacture and processing; and captured, tagging, and storing images of the manufactured and processed piece of merchandise with the embedded identification, in the inventory system.

In one embodiment, the identification is one of a label, radio frequency identification chip, bar code with ink, or memory thread, which contains information on the measurements or actual sizing of the merchandise.

In one embodiment, when the merchandise is hard goods, the pattern is sent to a molding device or other type of machine for development of a mold or actual item and embedding of the identification, and when the merchandise is soft goods, the identification is sewn into the merchandise.

In one embodiment, the embedding step further includes: placing the merchandise on an industrial conveyor system having robotic arms to pick up each said piece of merchandise for processing; scanning and capturing images of each said piece of merchandise to collect information and measurements thereof, using a scanning and/or image capturing device; utilizing the information and measurements on each piece of merchandise to calculate sizing and develop the unique identification for each piece of merchandise; and embedding the unique identification using one or more embedding devices.

In one embodiment, when the merchandise is soft goods, the method further includes flattening the merchandise using a puffing vent or blower.

In one embodiment, at least one of the scanning and/or image capturing device or one of the embedding devices, is a measuring wand or a combination measuring wand and embedding device.

In one embodiment, the method includes tracking and managing the merchandise in the inventory system, via the unique identification number and using a global positioning system (GPS).

In one embodiment, the inventory system can be accessed in a non-English language.

In one embodiment, electronic shelves and electronic hangars provide information and measurements or sizing of the merchandise to a user.

In one embodiment, an alert is provided to a user when each piece of merchandise leaves a store location without payment.

In one embodiment, the method further includes: receiving measurements from a user obtained from sensors in one of a body covering or from the scanning and/or image capturing device which captures images of a body and creates an avatar with the measurements; and searching the database for the merchandise with the measurements.

In one embodiment, the embedding device includes one of an RFID chip embedding device, an ink embedding device, a label device, or a specialty thread embedding device.

In one embodiment, a method of sizing merchandise in a virtual environment, includes: receiving and storing in a database, measurements from sensors in one of a body covering or from an image capturing device which captures images of a body and creates an avatar with the measurements; processing the measurements to obtain sizing; and utilizing the measurements from the body covering or the avatar, to obtain the merchandise with the sizing.

In one embodiment, the image capturing device is one of a digital camera, scanner, closet, mirror, stand, store or screen.

In one embodiment, the method further includes: searching a database of an inventory system for the merchandise with the measurements.

In one embodiment, the method further includes: providing a store location having the merchandise, to a user.

In one embodiment, the method further includes: receiving information from unique identification embedded in the merchandise, to manage production, manufacturing, transportation, and inventory of the merchandise.

In one embodiment, the user is provided with a personal catalog of merchandise specifically populated with inventory suitable for the user, for view and purchase.

In one embodiment, the method further includes: mapping measurements obtained using a real-time image of a user captured by the scanning and/or image capturing device, onto the merchandise in a closet of the user, to provide the user with merchandise that fits.

In one embodiment, a GPS location of said merchandise is provided to the user.

In one embodiment, the method further includes: sending the measurements to a designer or manufacturer to develop a pattern for merchandise specific to the user.

In one embodiment, the method further includes: providing a hologram of a user and mapping the merchandise over the hologram of the user to obtain correct sizing of the merchandise.

In one embodiment, an inventory management system includes: a cutting device which cuts material into a pattern; a scanning and/or image capturing device which captures images of the material as the material is cut into the pattern to form a piece of merchandise; and an embedding device which embeds a unique identification into the merchandise.

In one embodiment, the embedding device is part of an industrial conveyor system including: at least one robotic arm which picks up each piece of merchandise and places each piece of merchandise on a conveyor belt; a robotic device which scans the merchandise, and collects information on the merchandise, including measurements of the merchandise and the embedded unique identification; and a robotic arm which moves the merchandise to a container after the embedding device embeds the unique identification.

In one embodiment, the embedding device includes one of an RFID chip embedding device, an ink embedding device, a label device, or a specialty thread embedding device.

In one embodiment, when the merchandise is soft goods, the system further includes a puffing vent or blower which flattens the merchandise.

In one embodiment, the robotic device is a measuring wand.

Thus has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention is directed to an apparatus and method for the sizing of goods, merchandise, clothing, footwear, and other types of products, during the production and assembly phase, as well as for services related thereto, including the collection, conversion, storage, ID/tagging, tracking, security for loss prevention, management of production equipment, communication, rendering/conversion from 2D, 3D, 4D, 5D, video or other format and the integration of a live inventory system, in an interactive software application, virtual world, social network, commercial and/or game application, catalog, store, which provides a real world experience to the user.

The present application incorporates by reference in their entirety, U.S. Pat. Nos. 8,458,028, 7,373,377, 8,228,325, 8,225,220, and 7,246,730, as well as U.S. patent application Ser. No. 13/629,198, filed Sep. 27, 2012.

Physical Architecture a. Client System

Figure 1:
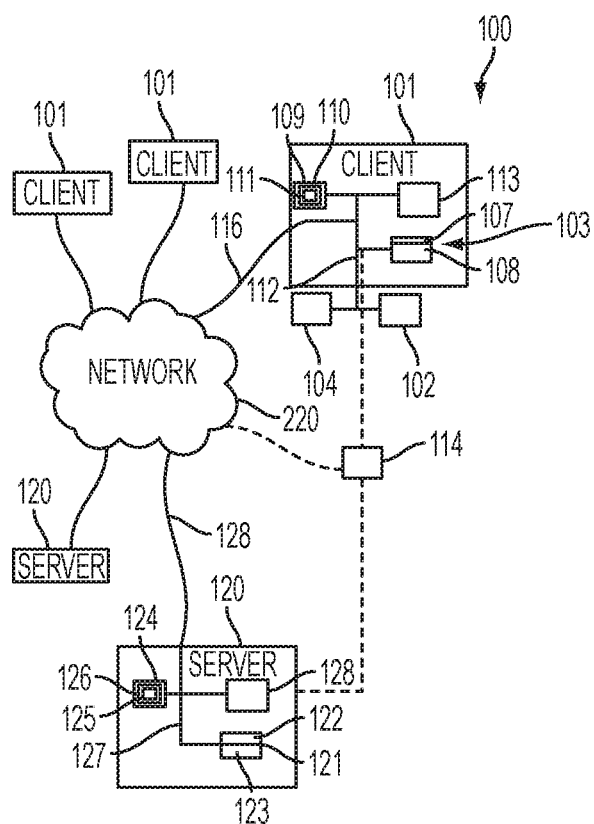
FIG. 1 is a schematic drawing of the client-server environment, according to one embodiment consistent with the present invention.

The system 100 of the present invention may include a client 101 (see FIG. 1) which may be a personal computer (PC), a mobile terminal, such as a mobile computing device, a mobile phone, or a mobile data organizer (i.e., personal data assistant (PDA)), operated by the user accessing the software program of the present invention remotely from the client 101, or any other digital device that has a display screen and database storage.

The client computer 101 typically includes a processor 106 as a client data processing device or means, the processor 106 including a central processing unit (CPU) 107 and an input/output (I/O) interface 108, a memory 109 with a software program 110 having a data structure 111, all connected by a bus 112, as well as an input device 104 or means, a display 102, and may also include a secondary storage device 113. The bus 112 may be internal to the client 101 and may include an adapter to a keyboard 104 or input device or may include external connections.

The processor 106 at the client 101 may be internal or external thereto, and executes a program 110 adapted to predetermined or programmed operations. The processor 106 has access to the memory 109, in which may be stored at least one sequence of code instructions comprising the program 110 and the data structure 111 for performing predetermined or programmed operations. The memory 109 and program 110 may be located within the client 101 or external thereto in an external database storage 114.

The program 110 can include a separate program code for performing a desired operation, or may be a plurality of modules (not shown), such as those described below, performing sub-operations of an operation, or may be part of a single module of a larger program 110 providing the operation.

The processor 106 may be adapted to access and/or execute a plurality of programs 110 corresponding to a plurality of operations. An operation rendered by the program 110 may be, for example, supporting the user interface, performing e-mail applications, etc.

The data structure 111 may include a plurality of entries, each entry including at least a storage area that stores the databases or libraries mentioned above with respect to the logical architecture.

The storage area 113, 114 or device stores at least one data file, such as text files, data files, audio, video files, etc., in providing a particular operation. The data storage device 113, 114 or means, may, for example, be a database 113, 114, including a distributed database 114 connected via a network, for example. The storage device 113, 114 may be connected to the server 120 and/or the client 101, either directly or through a communication network, such as a local area network (LAN) 220 or wide area network (WAN), or the internet. An internal storage device 113, or an external storage device 114 is optional, and data may also be received via a network 220 or the internet and directly processed.

Methods and systems consistent with the present invention are carried out by providing an input means 104, or user selection means 104, including "hot clickable" icons etc., selection buttons, in a menu, dialog box, or a roll-down window of an interface provided at the client 101, and the user may input commands through a keyboard, pen, stylus, mouse, speech processing device or means, touch screen, or other input/selection devices or means 104. The selection device 104 or means may also include a dedicated piece of hardware or its functions may be executed by code instructions executed on the client processor 106, involving a display unit 102 for displaying a selection window and a keyboard 104 for entering a selection, for example.

In methods and systems consistent with the present invention, the client 101 is connected to other clients 101 or servers 120 via a communication link 116 as a client communication device 116 or means, using a communication end port specified by an address or a port, and the communication link 116 may include a mobile communication link, a switched circuit communication link, or may involve a network 220 of data processing devices such as a LAN, WAN, the Internet, or combinations thereof. The communication link 116 may be an adapter unit capable to execute various communications protocols in order to establish and maintain communication with the server 120, for example. The communication link 116 may be constituted by a specialized piece of hardware or may be realized by a general CPU executing corresponding program 110 instructions. The communication link 116 may be at least partially included in the processor 106 executing corresponding program 110 instructions. The client system 101 may include communications via a wireless service connection.

b. Server System

In one embodiment consistent with the present invention, if a server 120, or servers 120, are used in a non-distributed environment, the (each) server (see FIG. 1) would include a processor 121 having a CPU 122 which is a server data processing means, and an I/O interface 123, but may also be constituted by a distributed CPU including a plurality of individual processors 121 on one or a plurality of machines. The processor 121 of the server 120 may be a general data processing unit, but preferably a data processing unit with large resources (i.e., high processing capabilities and a large memory 124 for storing large amounts of data).

The server 120 would also include a memory 124 with program 125 having a data structure 126 all connected by a bus 127. The bus or similar connection line can also include external connections, if the server 120 is a distributed system. The server processor 121 may have access to a storage device 128 for storing preferably large numbers of programs 110 for providing various operations to the users, as well as the external storage 114.

The data structure 126 may include a plurality of entries, each entry including at least a storage area which stores information, but may also have alternative embodiments including that associated with other stored information as one of ordinary skill in the art would appreciate.

The server 120 may be a single unit or may be a distributed system of a plurality of servers 120 or data processing units, and may be shared by multiple users in direct or indirect connection to each other. The server 120 performs at least one server program 125 for a desired operation, which is required in serving a request from the client 101.

Figure 2:
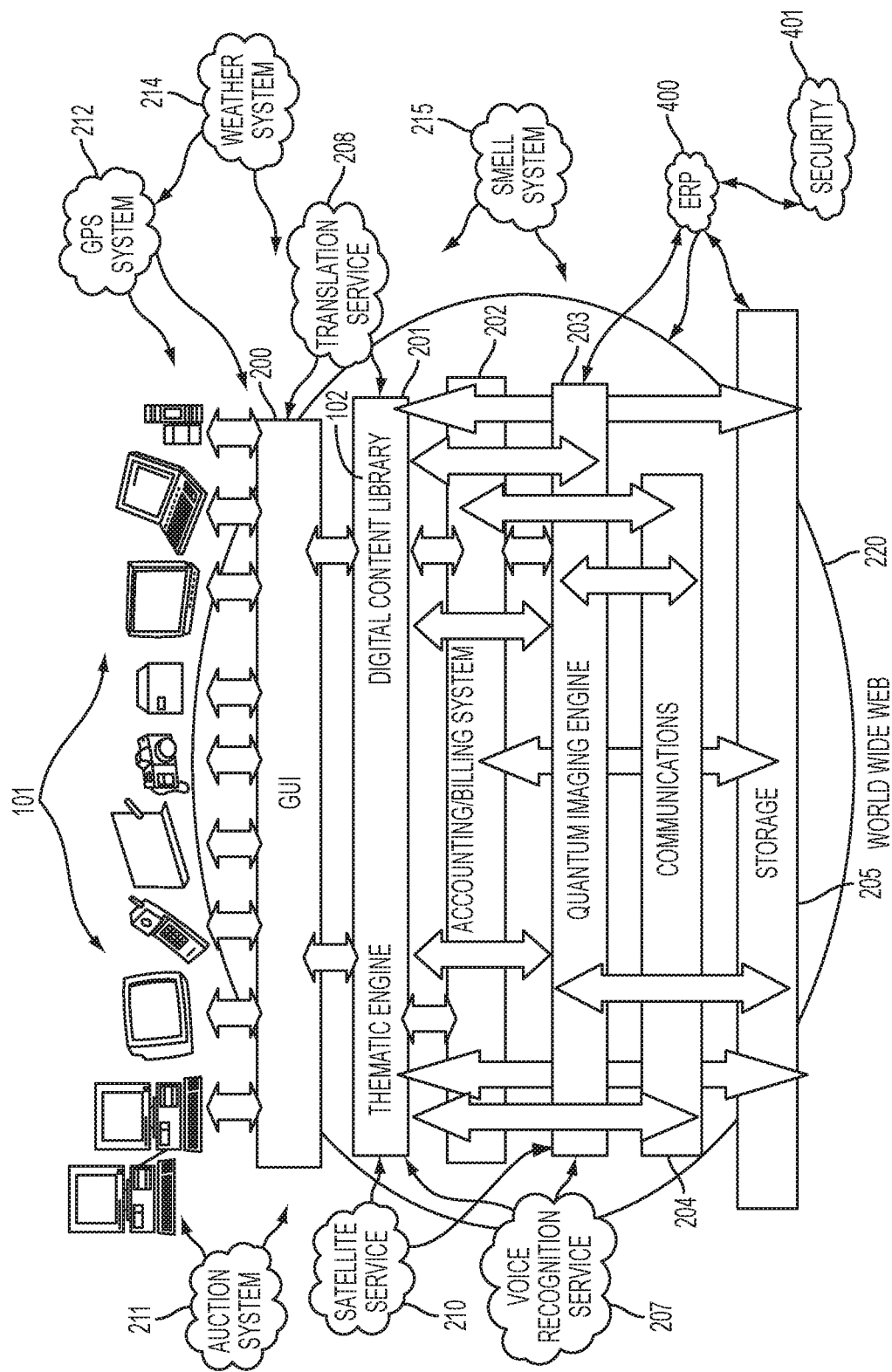
FIG. 2 is a schematic drawing of an overall interaction of major components of the present invention.

The communication link 129 from the server 120 may be preferably adapted to communicate with a plurality of clients 101. The server 120 system may include communications with network/security features 514 (see FIGS. 2 and 5), via a wireless server 515, which connects to, for example, a satellite system 210, voice recognition system 207, business intelligence system 320, language translation service 208, and global positioning system (GPS) 212, enterprise resource planning system (ERP) 400, or security system 401. However, one of ordinary skill in the art would know that other systems may be included, such as an auction system 211, weather system 214, smell system 215, etc. A synthesized smell device 215 can output odors such as smells for perfume, for example. The synthesized smell device 215 and the present invention can be connected via the internet and currently available supportive devices.

The server program 125 may relate to providing a number of operations related to online commercial applications.

c. Client-Server Environment

Figure 12:
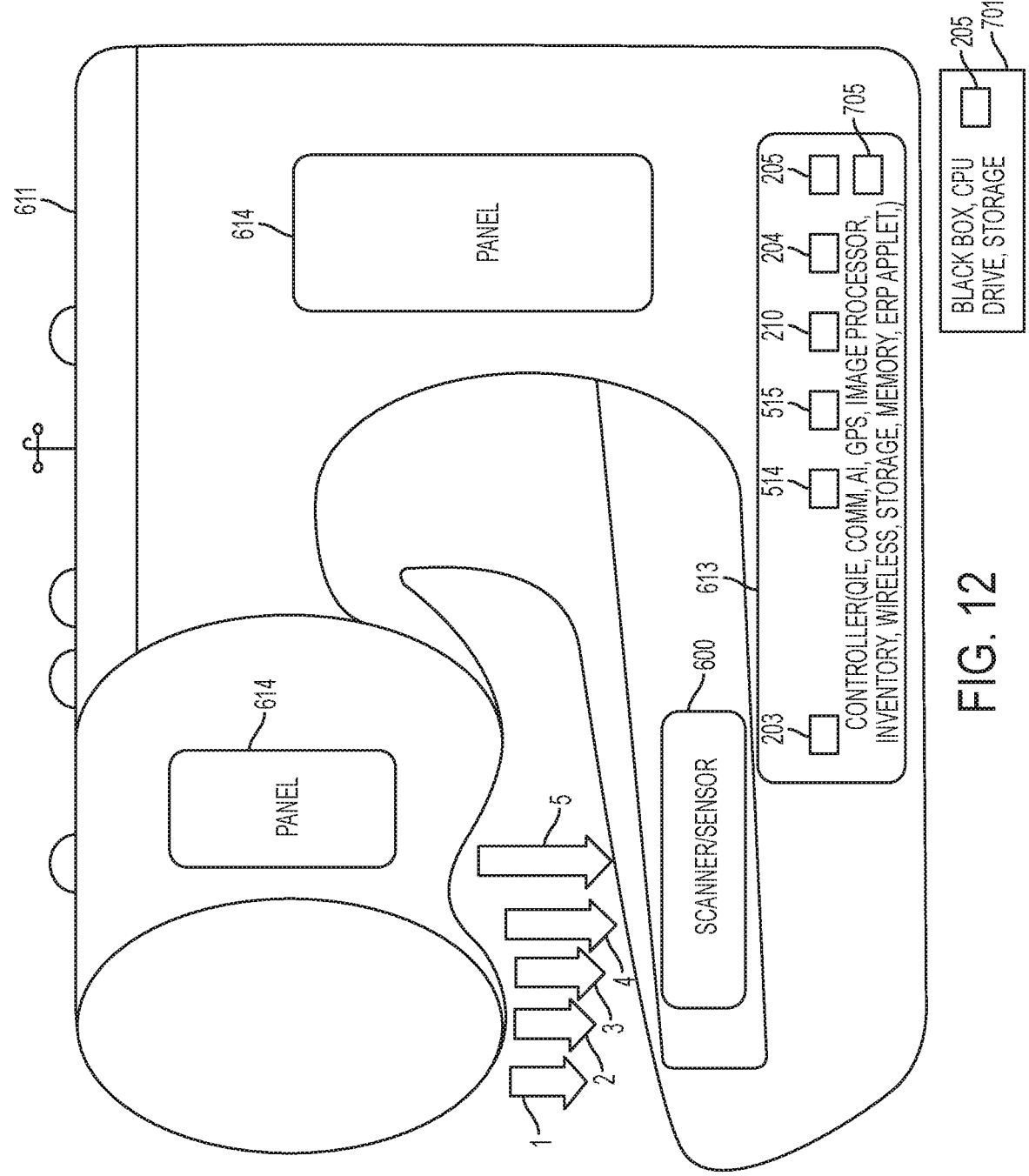
FIG. 12 is a schematic diagram of a sewing machine, an intelligent sensor, imprinting arm/needle, and a embedding to determine the size, embed an RFID chip, and or imprint bar code or other ID information during the manufacturing of merchandise, goods, etc., according to one embodiment consistent with the present invention.

The virtual platform of the present invention includes a graphical user interface (GUI) 200 (see FIG. 2), Thematic Engine 201 which includes a Digital Content Library 1301 (see FIG. 4), a Polling Engine 1303, and Data Zones 1302 (see FIG. 12), for example, which may communicate with Communications 204 (i.e., a communication link), an Accounting/Billing system 202, and a Data Storage 205. Specifically, in one embodiment, the present invention may be presented in a client-server arrangement, or in a distributed environment. The client system 101 includes components such as a graphical user interface (GUI) 200, and may contain a Quantum Imaging Environment (QIE) 203, and Thematic Engine 201. The client system 101 interacts with the server system 120 via an Application Interface 504 (see FIG. 5).

In particular, the program of the present invention is in a Quantum Imaging Environment (QIE) 203. The QIE 203 includes an interpreter that will allow data to be transmitted to any device 101, and is the basis for the design structure and layout for applications. The QIE 203 allows developers to develop objects and applications from the interpreter for virtual environments (i.e., retail, gaming, auction, or other thematic environments), the representation of the layout and design may be in the representation of "zones", and the layout and design may be set up as zones and content, for retail, educational purposes, etc. The QIE 203 pertains to the most common denominator—the application architecture, and the content. The QIE 203 is an interpreter that will take all of the rich content, interpret the information into objects to be manipulated and accessed via any device and place these objects or information in the appropriate format that is designed or will be designed by the developer.

The QIE 203 interacts with the Accounting/Billing system 202, Data Storage 205 and Communications 204, as well as the Digital Content Library 1301 of the Thematic Engine 201. The data may be manipulated in object form or some other form that would be accessed, manipulated and interpreted on any digital device.

The QIE 203 system is designed around Open Source technologies, but can include custom software developed in an open standards environment. By using Open Source and proprietary technologies with generic APIs, the present invention is scalable as the numbers of users increase, and the advances can be programmed as Open Source technologies.

In another embodiment, the QIE 203 engine is located on a main computer client-server system (see FIG. 5) working over the internet 220, intranet, cloud, etc., that includes a minimum of a storage device, an arithmetic processor or high level processing chip that can process different levels of algorithms such as fractals, polynomials, linear based calculations, etc., a communication link, and an AI engine.

The QIE 203 collects content from the real world (i.e., content from the vendor's websites, information on time, weather, late-breaking news, etc.) and injects this content into the thematic virtual world through the Thematic Engine 201.

The GUI 200 is a lightweight client application written to run on existing computer operating systems which may be ported to other PC software, personal digital assistants (PDAs), and cell phones, and any other digital device that has a screen or visual component and appropriate storage capability. The GUI 200 contains an engine for providing graphic hardware capabilities, graphic memory and structures, controls graphic object rendering on hardware, creates/manipulates 2D and/or 3D objects, video objects, streaming video, web objects, lines, rectangles, spheres, vectors, matrices, etc., manipulates animation, colors, bitmaps, textures, images, defines coordinate system and defines world boundaries, defines frames, bounding boxes, camera angles and views, lighting and shadowing etc., provides plug-in extensions, user input stream, event triggers, error handling, management of voice, music, and other graphic and voice formats, voice recognition, and translation services drivers, for example.

Figure 3:
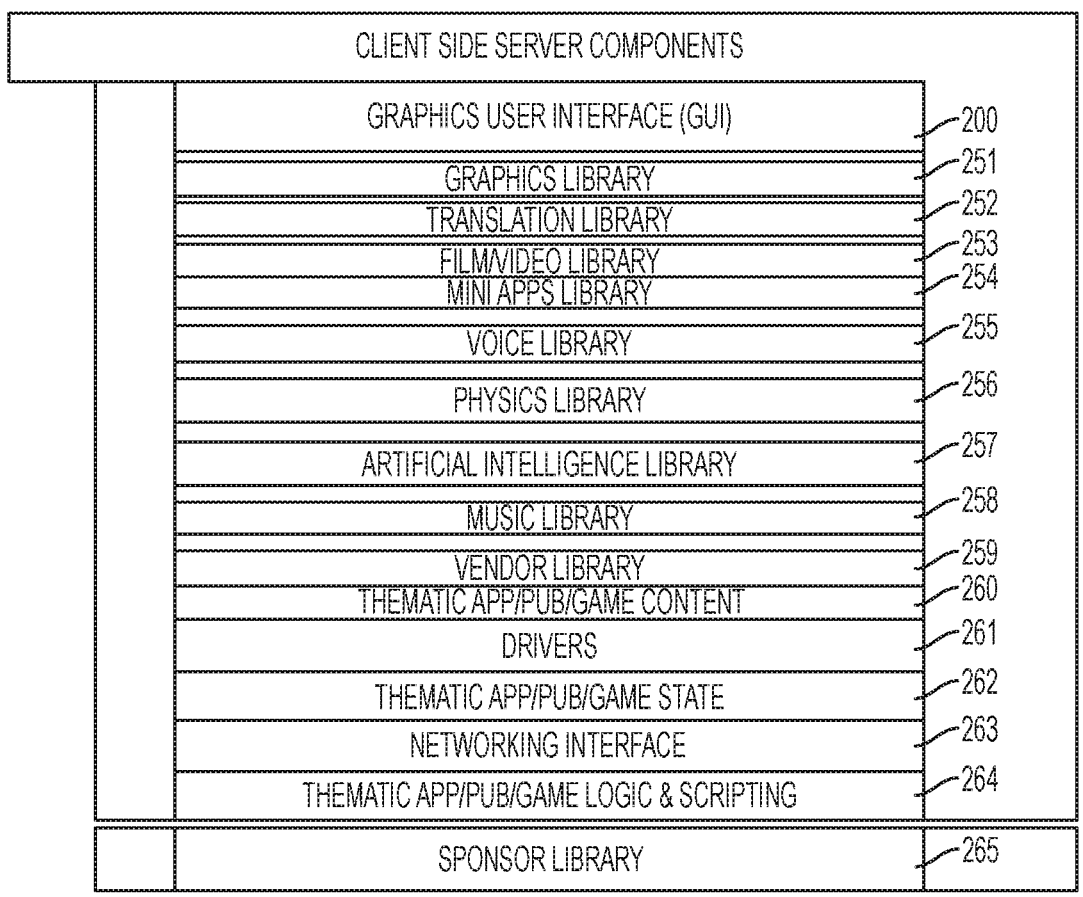
FIG. 3 is a schematic diagram of client-side server components, according to one embodiment consistent with the present invention.

In particular, the graphics engine 251 (see FIG. 3) of the GUI 200 is responsible for manipulating graphic content including rendering 2D and/or 3D objects, avatars, and background images. The graphics engine 251 of the GUI 200 takes such objects and renders them into a 2D/3D space for display on the output device 102, or it can display the objects in a system that provides a holographic environment for the manipulation of images. The graphics engine 251 is also responsible for handling lighting, camera positioning, and shading. The graphics engine 251 of the GUI 200 takes into consideration graphic device display capabilities and acceleration features. One side task of the graphics engine 251 of the GUI 200 is to collect user input and provide it to the Thematic Engine 201, for example.

The GUI 200 engine pours in real world content rendered in HTML, XML, RDF, and/or QIE-rendering format or any content format. The user interacts completely with the GUI 200, beginning with login into the virtual environment, in user help, etc. The GUI 200 also interacts or connects to the Thematic Engine 201 and an object-oriented database management system (ODDBM), and/or content management system. The GUI 200 also has all the data related to the user's manipulation of the selection device 104 or means, including any keyboard strokes, use of a pen, joystick, interactive goggles, touch screen, or any other interactive hardware component that would allow the user the ability to move objects, people, etc.

In addition to the graphics library 251 (see FIG. 3), the GUI 200 includes a translation library 252, a film/video library 253, a mini applications library 254, a voice library 255, a physics library 256, an Artificial Intelligence (AI) library 257, a music library 258, a vendor library 259, a thematic application/publication/game content library 260, drivers 261, a thematic application/publication/game state component 262, a networking interface 263, and a thematic application/publishing/game logic and scripting component 264.

The translation library 252, the film/video library 253, mini applications library 254, and a voice library 255, are all related to the engines and/or services associated with the libraries that support both a client 101, such as a client-server, or server-based 120 model. In one example, the program 110 runs from a client 101 only, which can be connected to a server 120, but in most cases is limited to the client 101. In one example, the translation library 252 will include program code that will allow the translation of one language into a different language—for example, Chinese to English. The information or data of the translations will be stored or can be located in the Thematic Application/Publishing/Game Content library 260.

The Film/Video library 253 includes programming code that will allow the present system to re-create and maintain the attributes of a number of film strips or video in its appropriate format using the appropriate code or language(s). The Film/Video library 253 may interact with the GUI 200 and Vendor Library 259, and possibly the QIE 203 and/or the Graphics library 251 for processing and display through the appropriate drivers 261 to the screen 102. The information or data may be stored or can be located in the Thematic Application/Publishing/Game Content library 260.

The mini-applications library 254 will include programming code to create the appropriate application selected by the user. The mini-applications library 254 may interact with the GUI 200, Vendor Library 259, and the Graphics library 251 for processing, and possibly the QIE 203 and/or the Graphics library 251 for processing and display through the appropriate drivers 261 to the screen 102. The information or data may be stored or can be located in the Thematic Application/Publishing/Game Content library 260. The amount of information is determined based on the set of instructions, programming code, etc.

The Voice library 255 or audio will allow for the programming, and/or generation of the audio particular to a frame or to the 2D/3D images. The Voice library 255 will interact with the GUI 200, Vendor Library 259 and possibly the QIE 203 and/or the Graphics library 251, and the appropriate drivers 261 will process the information for output. Voice is also used in this sense to take information via a microphone 104 or some type of input device 104 into the system, which is processed through the GUI 200, passed to the QIE 203 for processing and/or to the Voice library 255 for instruction to be passed back to the Graphics library 251 and back through the GUI 200 and drivers 261 to be outputted through a set of speakers or output device. The information or data will be stored or can be located in the Thematic Application/Publishing/Game Content library 260.

The Music engine/library 258 maintains the specifications for the music, music state, and all the properties, data, logic, and rules and programming that are associated with the integration and output of music in the thematic applications. The Music library 258 will allow for the programming, and/or generation of music particular to a frame or to the 2D/3D images. The Music library 258 may interact with the GUI 200, Vendor Library 259, drivers 261, and possibly the QIE 203, and/or the Graphics library 251. After the Music library 258 finds the appropriate piece of music, the program will transfer the data back to the GUI 200 and Drivers 261, to an output device or set of speakers. The information or data will be stored or can be located in the Thematic Application/Publishing/Game Content library 260, or can be pulled from a satellite transmission via the satellite service system 210. The Music engine 258 may release the memory 109 used upon completion of its task.

Each of the libraries—Translation 252, Film/Video 253, Mini Applications 254, Voice 255, Music 258, and Vendor 259—may obtain the appropriate information for data, voice, music etc., from the storage area 205 or disk and/or the Thematic Application/Publication/Game content 260, and may maintain all the information for the profiling, "game" state, and business information and tracking, by accessing the Thematic Application/Publication/Game state component 262, and by connecting to the Thematic Application/Publishing/Game Logic and Scripting component 264. The libraries will process the information, voice, data, music, etc., as appropriate or through the QIE 203, for display on the screen 102 or throughput to the digital devices speaker or speaker system, utilizing the drivers 261 and networking interface(s) 263. This option allows the user the use of the thematic application directly on his/her digital device 101 without connecting to the internet 220.

The physics engine of the physics component/library 256 controls the behavior of objects as they would be affected by various laws of nature. The physics engine of the physics component/library 256 provides mathematical manipulation to objects as to how they would react to gravity, rapid deceleration, and chaotic behaviors. The physics engine of the physics component/library 256 may inform the Thematic Application/Publishing/Game Logic & Scripting component 264 when the object should be changed given the current set of physics logic. The physics engine component/library 256 may interact directly with the Thematic Application/Publishing/Game Logic & Scripting component 264.

The physics engine component/library 256 controls releasing memory, relates physics objects to game objects, provides physics object duplication, maintains the physics object state, and provides data on object modification due to equations and the Thematic Application/Publishing/Game Logic & Scripting component 264. The physics engine component/library 256 disables the local physics code when in multi-user mode and assumes those tasks. The physics engine component/library 256 may interact directly with the Thematic Application/Publication/Game Logic & Scripting component 264 for all networked users, and also may rely on a real-time thematic database for partial and context information.

Two technologies that may be used in conjunction thereof or separately, to manipulate the data and access the data, include imaging technology and holographic imaging technology. In addition, other technology language-based algorithms can be used in recalculating the content, shapes, graphics, images, music, and video (every type of media), in order that the data can be exposed, manipulated, and accessed on any device.

The Thematic Engine 201 on the client system 101 (see FIG. 5), includes all the libraries that are needed for the interactive components of the applications such as animation, graphics, artwork, overall content, web content, and utilizes the services of translation, currency, satellite transmission, video, music, and voice-over libraries, for example. In addition, the Thematic Engine 201 contains the profile of the active users, their current states, individual histories, associations between other active users when in a game format (i.e., team members), and associations within the virtual world, such as with non-game characters.

In addition, the Thematic Engine 201 is designed for vendors in order to incorporate merchandise placement, video feeds, and mini-applications, web sites, e-commerce, music, voice, smell, and GPS system information into the virtual world. The Thematic Engine 201 may also be used for the development of mini-applications that are dictated by the vendor, and will allow a developer to build a simulated e-mail, spreadsheet, database, and any type of application that is vendor-based or pertains to the overall thematic application.

The Thematic Engine 201 on the server system 120 (see FIG. 4) is accessed through the GUI 200, and contains the environmental game rules. The Thematic Engine 201 is the director of all previous components by working with a pre-defined (but modifiable) set of rules and events from objects, and coordinates further actions to be taken as to what will constitute the thematic environments. In particular, the Thematic Engine 201 initializes global memory structures, validation of thematic objects and engines, startup procedures for all engines, collects objects for all engines, initializes the default thematic environment, provides user information, interacts and validates the engines' status, provides access and execution to thematic environment rules, controls and creates events from engines, provides state change to all engines, provides scripting language for explicit object modification, and provides shutdown for all engines.

The Thematic Engine 201 also interacts directly with the Data Storage 205, obtaining and updating information (i.e., states, profiles and history) on the active users. The Thematic Engine 201 includes a Digital Content Library 1301 and passes information back and forth to the specific sub-folders and document management system.

The Thematic Engine 201 also ties directly into e-mail or chat systems 327 and other communications 204 applications that are necessary to the thematic applications or which may be used directly in the thematic applications. The Thematic Engine 201 will also tie directly to the Accounting/Billing system 202 for calculating the time, rewards, points, order, purchase, billing and shipping components, etc. As the Thematic Engine 201 needs information, the Thematic Engine 201 will pull that data from the Accounting/billing system 202 and its Digital Content library 1301, or the reverse, depending upon the needs of the application environment.

In a gaming environment, for example, the Thematic Engine 201 may be programmed to "grab" data/objects to be utilized in the application/game. Any objects may be also be "copied and grabbed" by maintaining the original information of the data or objects and will allow the use of that image, while maintaining the data and integrity of the object, within the application.

In one embodiment, the thematic application will accept still images and/or video feed that contains images, fashion shows, concerts, instructions, and other information that is being used within the game and or real life application. The still images and/or video feed will be transmitted through the thematic system 201 for processing. The thematic application will either incorporate the still images and/or video feed directly into the application/game zone, store it in the digital content library 1301 or a temporary location for further instruction and processing. If the images are not in the correct format, they will be transmitted to the QIE 203 engine for further processing and rendering. The format of the video can be either in a singular format or if multiple images and/or videos are to be viewed, may be shaped in any way for example a carousel, pyramid, square, or some type of form designed by the game designer that will display each image to be selected by the user for viewing. The user will have the option of viewing, purchasing or "clicking" on or off the image to go to the next area of interest. The user also has the option of exiting the game or (real-life) application to an external web site dedicated to the vendor for further information as well as purchasing additional goods or services. Upon completion, the user will be returned back to the application/game to continue from the point that they exited.

The Thematic Engine 201 may provide a storage facility for all thematic content required in the virtual environment. Objects may include video, audio, images, rule sets and default values for all objects used in the thematic environment. The Thematic Application/Publishing/Game Content component 260 may also provide multiple methods for accessing the objects and maintains a record of where objects are located. Other tasks may include providing caching of commonly used objects and a method to update objects.

The Thematic Application/Publishing/Game Content component 260 may control releasing memory, initialize data access protocols, provide access to objects on local hardware and remote hardware, caching services, compression services, versioning services, updating of objects, error checking, a framework for sub-AI engines, and error handling.

The Thematic Application/Publishing/Game Content component 260 may interact directly with the client-side server Thematic Application/Publishing/Game Logic and Scripting component 264, the graphics component 251, AI component 257, as well as the Network Interface 263.

The server drivers 261 are instructions, connections, or translations that allow the input or output of data to be recognized by certain hardware for example a screen 102, phone 101, microphone, keyboard, pen, the internet 220 etc.

The server Thematic Application/Publishing/Game state component 260 (see FIG. 4) maintains the state or information of the virtual environment. For example, in a gaming environment, if the character moves to the right and stops, the Thematic Application/Publishing/Game state component 260 tracks the actual movements of what it took to make that character move and stop. If the object is transformed to a different object, the component 260 tracks the steps that it took for that image to be transposed. The Thematic Application/Publishing/Game state component 260 will maintain the exact location of where the thematic application is stopped, such that the user can return to this same spot upon the user's return to the thematic application. The Thematic Application/Publishing/Game state component 260 also maintains the imaging, data, music, voice, film, etc. for that location. However, the content may indeed change depending upon other users/players/etc., and/or the update of information that has been added to or removed from the main system or the server 120. Although the user may be able to return to the same location and begin again, the program 110 may change the quests, questions, object(s), stores, merchandise placement etc.

The Thematic Engine 201 may be written in C, C++, C#, Java, Python™, Curl™, and/or Assembler, or any another language that is suited for this type of interaction and/or libraries.

The Digital Content Library 1301 of the Thematic Engine 201, ties into the QIE 203 engine. The Digital Content Library 1301 is a content management application or database of the Thematic Engine 201 that will be laid out into sections or subsets and its own respective groups similar to a filing cabinet (i.e., document management system 309). The Thematic Engine 201 also contains Data Zones which are laid out in sections and subsets as well, including for example, Zone 1: USA, Zone 1A: New York, Zone 1A1: New York City, etc.). Within each zone are a subset of data and another subset of data. Each will include, for example, the layout of the streets, buildings, stores, historic locations, rivers, streams, oceans, etc. It will also include the video, music, GPS information, and images relating to each city.

The Digital Content library 1301 includes all information such as data, codes, binary files, web content, event notification, and other information. The Digital Content library 1301 may also include scheduling directions for when the web site access and identification of where to place the web content or advertising, e-commerce, video, etc. are to be placed.

The Accounting/Billing system 202 is tied into the Thematic Engine 201 and the Data Storage 205. The Accounting/Billing system 202 is made up of several modules, which are directed to: accounting (i.e., purchasing, ordering, billing, shipping, and payment processing) for both the vendors and users, including all user information accumulated within the application (i.e., rewards, points, time (based on time zones), stopwatch or timer); creating/maintaining user profile information; a transaction database which tracks business intelligence data, licensing, rewards, points, time, and user info; maintaining a vendor database 324 of business information; a user database 324 (i.e., order configuration, encryption & compression, library data); electronic messaging 326 (i.e., e-mail, chat, or other applications); and interacts with a Business Intelligence service module 320.

The Accounting/Billing system 202, as well as the QIE 203 (see FIG. 2), maintains the profiles of the active users, their current states, individual histories, associations between active users (i.e., team members), and associations with non-users (i.e., characters within the thematic virtual world). The Accounting/Billing system 202 interacts with the Thematic Engine 201 as well as the other layers on an as-needed basis to update the profiling for the thematic applications, as well as information needed for business intelligence reporting.

The Accounting/Billing system 202 gathers business intelligence data, supplying the information to the user or the vendor in real-time, offering all of the latest data which is tracked within the applications. The Accounting/Billing system 202 interacts with the vendor database 325, providing relevant information (i.e., raw data, canned reports, etc.) to the vendor on the active user's consumer behaviors, including likes, dislikes, purchases, etc. Maintenance fees for upgrades and updates are automatically sent to the vendors.

The Accounting/Billing system 202 interacts with the Data Storage 205 to update information on the active users, determining what information is relevant today vs. yesterday. The Accounting/Billing system 202 ties back into the Thematic Engine 201 and then to the Data Zones 1302, as well as the application builder and interpreter (QIE engine 203).

The Accounting/Billing system 202 includes the rule-based component of business processes for e-commerce, such as advertising, billing, profiling, etc., and integrates easily with all the networked components, libraries, QIE 203, and business intelligence. The rules are developed using Java, C, C++, Python™, Curl™, or any other programming language. It includes XML, HTML or any markup language or other method for communication to connect and communicate with the internet and it will be extensible. The Accounting/billing system 202 handles the translation of rules to and from heterogeneous commercially important rule systems/languages, as well as to and from the existing components and external services performing actions and testing conditions, and maintains the status of the entire QIE 203 environment and keeps its services supported. The Accounting/billing system 202 includes intelligent agents for the following: e-commerce, procurement, catalogs, storefronts, auction, configuration, financial—billing and shipping, connecting to the services etc.

The Business Logic 306 (see FIG. 4) interacts with the Business Intelligence service module 320 for business intelligence data, supplying the information to the vendor in real time offering all of the latest data which is tracked within the applications. The Business Logic 306 component interacts with the vendor, providing relevant information (i.e., raw data, canned reports, etc.) to the vendor on the active user's consumer behaviors, including likes, dislikes, purchases, etc. Maintenance fees for upgrades and updates are automatically sent to the sponsors 328 (see FIG. 4). A database of sponsor information is kept in the sponsor database 329.

The Business Logic 306 interacts with the Data Storage 205 to update information on the active users, determining what information is relevant today vs. yesterday. The Business Logic 306 ties back into the Thematic Engine 201 and then to the zone application builder and interpreter (QIE engine 203).

The Business Logic 306 is written in C, C++, C#, Java, Python™, Curl™, and/or Assembler, or any other type of language appropriate to achieve the above-described features.

The logical architecture of the present invention is designed to provide future consideration for APIs at the Thematic Engine 201 and Accounting/Billing system 202 components. Using software development kits (SDKs), corporate sponsors using professional services, are able to make customer modifications to the thematic application or game.

The Data Storage 205 (see FIGS. 2 and 4) includes distributed databases containing all relevant information on the active user's profile in their current state, history, and real world content. The Data Storage 205 interacts directly with the Thematic Engine 201 and the Accounting/Billing system 202. The database tables will be distributed using an appropriate database application that will support grid-based logical architecture or other appropriate database architecture.

According to one embodiment of the invention, the data storage device 205 may store at least one data file, such as image files, text files, data files, audio files, video files, among other file types. According to one embodiment of the invention, the data storage device 205 may include a database, such as a centralized database and/or a distributed database that are connected via a network 220. According to one embodiment of the invention, the databases may be computer searchable databases. According to one embodiment of the invention, the databases may be relational databases. According to one embodiment of the invention, the databases may be object oriented databases. The data storage device 205 may be coupled to the server 120 and/or the client computer 101, either directly or indirectly through a communication network 220, such as a LAN, WAN, and/or other networks. The data storage device 205 may be an internal storage device 113. According to one embodiment of the invention, the system may include an external data storage device 114. According to one embodiment of the invention, data may be received via a network 220 and directly processed.

The Communications 204 of the server 120 system (see also FIG. 5) can handle a multiplayer network and will use standard internet communications that tie into existing libraries or with custom modifications.

The client Communications 204 interface (see FIG. 5) provides access to various network services required to interact with other users (such as a messaging service, system administration service, user/group administration service, chat service, thematic state tracking, and character profile service), and controls dynamic features as applied by the central servers. The client Communications 204 may provide alternate connection options, and controls termination of the connections.

The server Communications Network/Security interface 514 (see FIG. 4), addresses the security of the logical architecture at two levels. The integrity of the active user is maintained, and secure interaction between the system of the present invention and the vendor is maintained.

The server Communications interface 514 provides access to various network services required to interact with other users and control dynamic features as applied by the central servers. The server Communications interface 514 may include maintaining the state of the thematic environment amongst various users, providing anti-cheating and anti-theft mechanisms, providing messaging services between users, and passes information to and from the client 101 applications and other internal server 120 side applications.

The server Communications interface 514 may require interaction with the server Accounting/Billing system 202. The server Communications interface may also require access to other client software during use, and direct access to various databases' information for performance reasons.

The server Communications 204 (see FIG. 2) provides security functions such as user authentication and anti-cheat, anti-theft algorithms, and may also provide methods for secure billing and rewarding systems to users with audit functions. Security is maintained within the virtual environment to ensure that users adhere to virtual world rules. The server Communications 204 prevents hackers from accessing, modifying, or corrupting data (i.e., modifying their current state and history or the data of others), thus preventing sabotage for the active user population.

Security is also incorporated using encryption between the Accounting/Billing system 202 and the vendors to ensure that there is no back-door entry into the vendors' websites, nor proprietary consumer data is intercepted.

With respect to the service modules, these modules are state-of-the art systems which are conventionally available.

The server side AI engine 257 (see FIG. 4) interacts directly with the Thematic Engine 201. The AI engine 257 controls the behavior of objects that exhibit intelligence beyond that of the users or the thematic environment on the network. The AI 257 may be used to manipulate objects, for example, such as NPCs (non-player characters) when in a thematic/gaming context, animal characters in thematic environments, and simple games within the game. The AI 257 informs the Thematic Engine 201 when the object should be changed given the current set of AI logic. The AI engine 257 disables local AI code when in multi-user mode, and assumes those tasks. The AI engine 257 may also rely on the real-time thematic database for spatial and contextual information.

The AI engine 257 provide AI object duplication, relates AI objects to thematic environment objects, maintains the AI object state, provides data on object modification due to AI rules and thematic logic, provides secure transport of data to/from clients 101 and servers 120, receives data from the server 120, if provided, checks for errors in data, collects thematic environment state information from the client 101, and makes thematic environment state information available to the Thematic Engine 201, provides messaging services, and real-time file loading services.

The Vendor library (manufacturer) 324 (see FIG. 4) maintains the specifications for the vendor's product placement, display, storefronts, and all the properties, data, logic, and rules and programming that are associated with the integration and output of the vendor components or 2D/3D images in the thematic applications. The vendor library 324 may interact directly with the Thematic Engine 201, the GUI 200, the Accounting/Billing system 202, drivers 261, and the QIE 203. The data may be stored in the data storage 205, digital content library 1301, or pulled from a satellite transmission via the satellite service module 210. It will tie directly into the Thematic Engine 201, and will release the memory used upon completion of its task.

The Sponsor library (advertiser) 265 (see FIG. 3) maintains the specifications for the Sponsor's product placement, display, storefronts, and all the properties, data, logic, and rules and programming that are associated with the integration and output of the vendor components or 2D/3D images in the thematic applications. The sponsor library may interact directly with the Thematic Engine 201, the GUI 200, the Accounting/Billing system 202, drivers 261, and the QIE 203. The data may be stored in the data storage 205, digital content library 1301, or pulled from a satellite transmission via the satellite service module 210. It will tie directly into the Thematic Engine 201, and will release the memory used upon completion of its task.

The server Networking Interface 514 (see FIG. 5) provides access to various network services required to support the server 120, such as a messaging framework, etc., and includes maintaining the server component framework. The server Networking Interface 514 is responsible for extracting in real-time, real world information and normalizing it for the thematic environment. Data sources may consist of XML, SOAP, HTML, FTP, Telnet, or any other commonly available method of data transfer. Normalized rule sets are sent to the server Thematic Application/Publishing/Game Logic and Scripting component 260 for implementation in the thematic environment. The real world Networking Interface 514 is also responsible for maintaining rules that affect the thematic environment when no other real world data is available.

The server Thematic Application/Publishing/Game Logic and Scripting component 264 (see FIG. 4) takes data from a rule set as well as from external sources and modifies the thematic environment. Rules may be static and retrieved from a data source, or they may be dynamically created from an application tool. External rules will come from various sources and will arrive in a moralized manner. All real-time modifications to the thematic environment may be routed through the Thematic Application/Publishing/Game Logic and Scripting component 264.

Although the above physical architecture has been described above as client-side or server-side components, one of ordinary skill in the art would know that the above components of the physical architecture may be in either client 101 or server 120, or in a distributed environment.

Further, although the above-described features and processing operations may be realized by dedicated hardware, or may be realized as programs including code instructions executed on data processing units, it is further possible that parts of the above sequence of operations are carried out in hardware, whereas other of the above processing operations are carried out using software.

Further, although aspects of one implementation of the present invention are described as being stored in memory, one of ordinary skill in the art will appreciate that all or part of the methods and systems consistent with the present invention may be stored on or read from other computer-readable media, such as secondary storage devices, like hard disks, floppy disks, CD-ROM, or other forms of ROM or RAM either currently known or later developed. Further, although specific components of the system have been described, one skilled in the art will appreciate that the system suitable for use with the methods and systems consistent with the present invention, may contain additional or different components.

The present invention is implemented in software which can be provided in a client 101, client 101 and server 120 environment, or in a distributed system over a computerized network 220 (the physical architecture is described herein), or embedded in a controller that activates both the computer system and/or other devices.

Additional services are a subset of the Business Logic module 306 (see FIG. 4), and include e-mail, chat, order entry, purchasing, billing, and vendor fulfillment modules.

The virtual platform of the present invention may use the support of PCs, or any other type of hardware that can support specific tasks at the Business Logic 306, Accounting/Billing system 202 and Thematic Engine 201. This may take the form of Grid, Artificial Intelligence (AI), or other technology advanced servers, or the entire system may be hosted on a very high level supercomputing system that can calculate very complicated algorithms and manage all processes supporting well over millions of users simultaneously.

In particular, the present invention may be used in a client-server context, or may be a distributed system across a number of client systems 101. Thus, in the present invention, a particular operation may be performed either at the client 101 or the server 120, at the edge of a network or at the center, or both. Therefore, at either the client 101 or the server 120, or both, corresponding programs for a desired operation/service are available.

In a client-server environment, at least one client 101 and at least one server 120 are each connected to a network 220 such as a Local Area Network (LAN), Wide Area Network (WAN), and/or the Internet, over a communication link. The steps in the methods consistent with the present invention are carried out at the client 101 or at the server 120, or at both, the server 120 (if used) being accessible by the client 101 over for example, the Internet using a browser application or the like.

Note that at times the system of the present invention is described as performing a certain function. However, one of ordinary skill in the art would know that the program is what is performing the function rather than the entity of the system itself.

The physical architecture of the present invention may include at least one co-located hosting site having racks containing server hardware blades running operation systems, and other necessary applications. The present application's co-located hosting sites may be deployed at two additional locations, providing full geographic diversity. These sites may be near major private or public peering points. The server hardware blades may be connected to storage devices using network attached storage (NAS); but could also be a combination of local disks and a Storage Area Network (SAN), and redundant Gig-E connectivity. The racks may be connected to the co-location hosting providers' switches providing direct connectivity to the Internet or contained in a single location. The present application co-location site may be fully redundant with multiple egress paths to the Internet. Interaction with the vendors and active users may be through secure and non-secure internet connectivity.

If there are separate administrative servers 120 for billing and general customer care, they may be maintained in physically separate locations from the main servers 120. The underlying technology allows for replication to various other sites. Each new site can maintain "state" with its neighbors so that in the event of a catastrophic failure, other server systems 120 can continue to keep the application running, and allow the system to load-balance the application geographically as required.

DESCRIPTION OF THE INVENTION

The present invention is directed to an apparatus and method for capturing and calculating the size of goods, footwear, clothing, and other types of merchandise including the storage of such goods in inventory for purposes of: purchase of goods and services, including the collection, conversion, storage, tagging, tracking, security, and the integration of a live inventory system, locating the goods and store location(s), populating a live auction and bartering system with the goods in an interactive software application, virtual world, social network, commercial and/or game application, which provides a real world experience to the user.

The present invention is also directed to the management of the industrial equipment for failure and production management, capturing the user's image and determining/calculating the user's actual size, and fitting the person's avatar, room etc. with the merchandise for either purchase, production of a catalog or other type of application designed specifically to support the user.

The present invention may be used in merchandising, entertainment, business, publishing, and other applications to provide a virtual and real world experience to the user by integrating audio, video, 2D, 3D, 4D, 5D and other technologies, that may enhance the user's experience. In particular, the program of the present invention injects real-time data, such as pricing, film, music, news, etc., into a virtual thematic environment which includes both audio and video, and also integrates mini-applications, such as word processing, banking, spreadsheets, purchasing (i.e., e-commerce applications, and any other type of application that can be scaled or as a demo), e-mail, and the like, into the virtual thematic environment, without a noticeable delay. The present system can be both a rich graphic environment, and may also include a holographic system and technology, mirror imaging technology, and high-level algorithms. The present invention can provide a virtual 2D, 3D, and/or 4D, or 5D, which can include not just audio, music and video, but sensitivity to touch, the sensing of odors etc., so that the user can experience a real world environment in which the user can move through in real-time.

In one embodiment, the system of the present invention may be used to size merchandise from the point of design to the cutting of the materials, goods, or merchandise.

Figure 6:
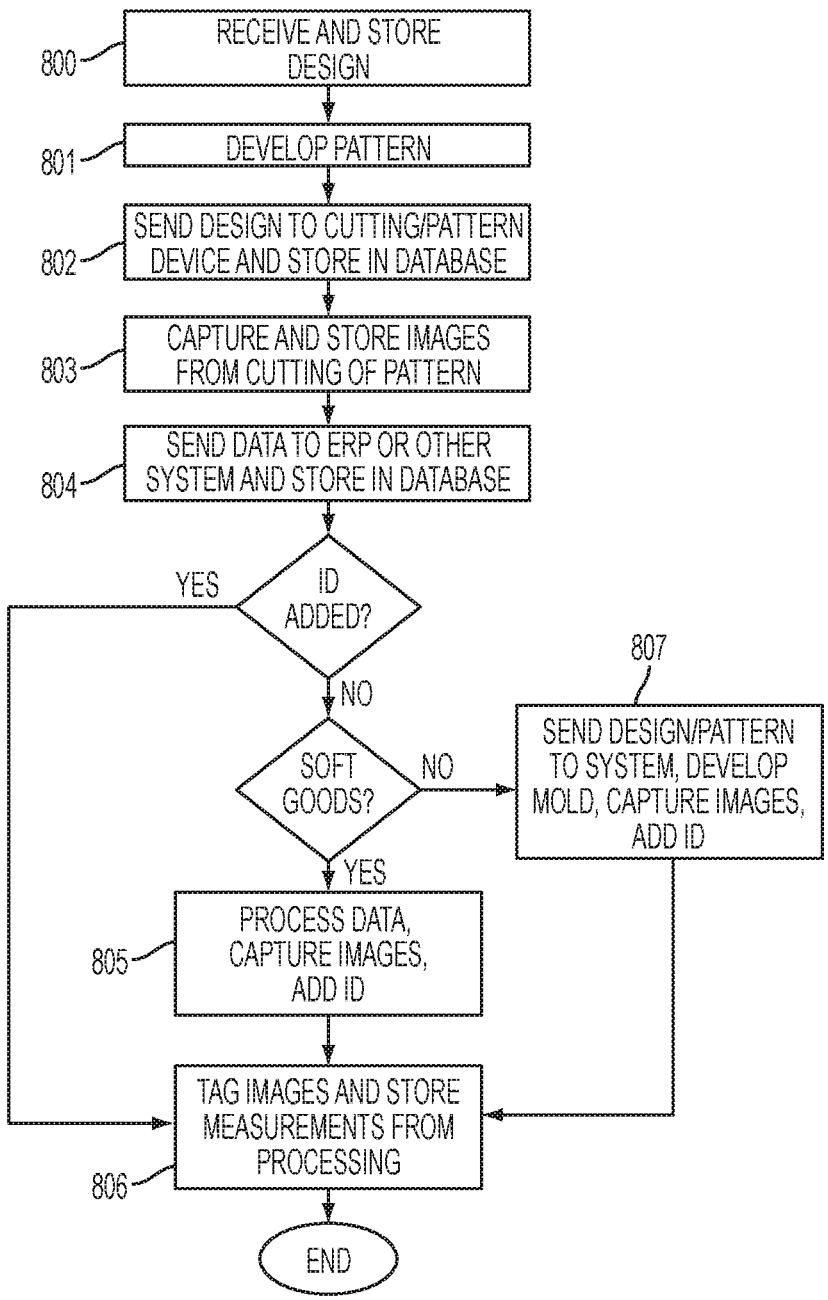
FIG. 6 is a flowchart of a method of embedding identification into a piece of merchandise to obtain measurements thereof, according to one embodiment consistent with the present invention.

In one embodiment, designers create their designs by sketching their designs onto a pad of paper or onto a tablet, phone, computer system 100 or other client device, and the designs are saved in a client storage device 113 or in the cloud in step 800 (see FIG. 6).

The next step or process is to develop a pattern. This pattern may be developed by a designer in any type of art/design application, CAD/CAM application, or sketched drawing, which is then saved, or scanned and saved in step 801, into a storage device 113 of a client computer system 100 or application.

Figure 11:
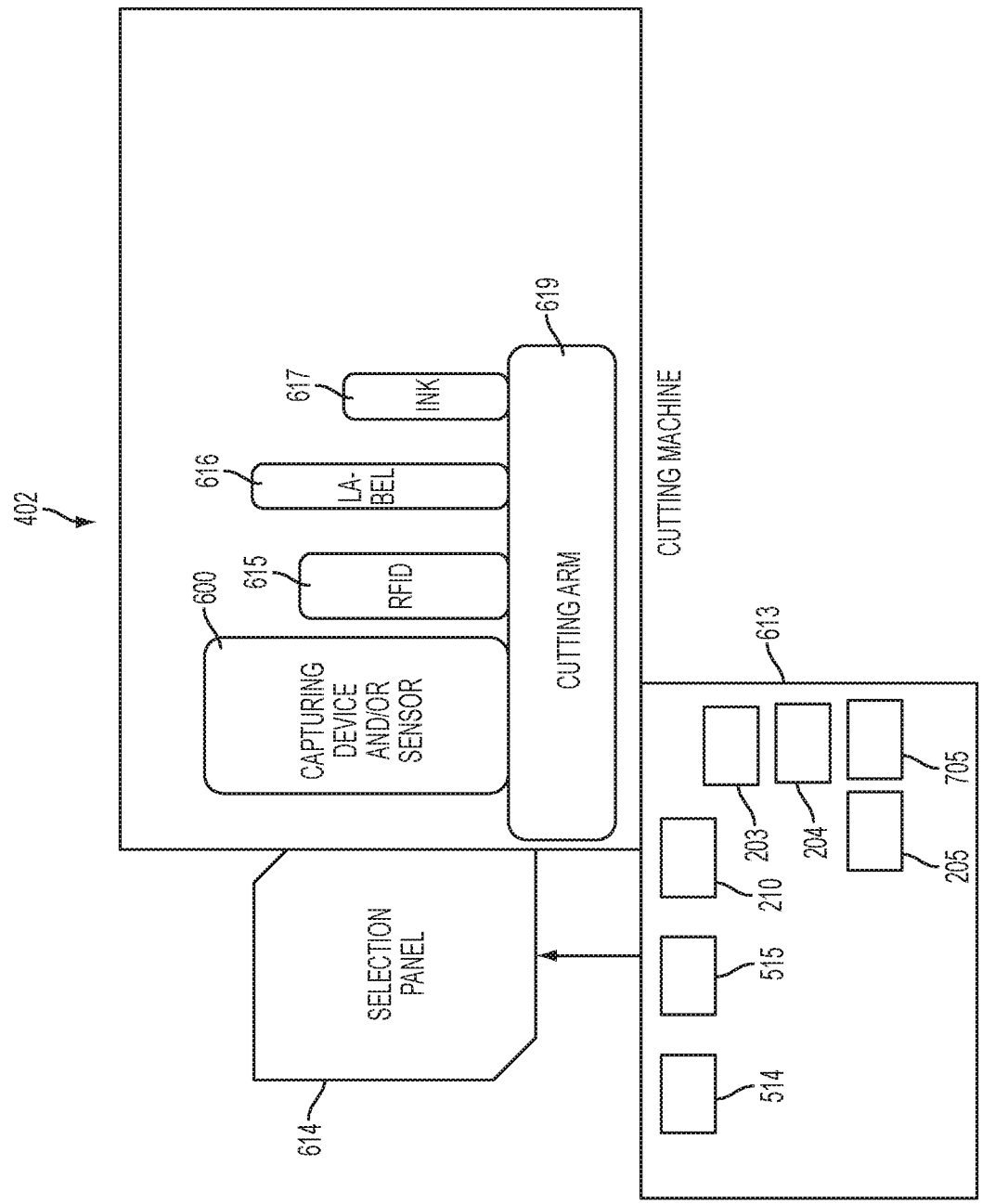
FIG. 11 is a schematic diagram of a pattern, cutting, and marking machine and capturing device and/or an intelligent sensor and hardware connecting to and processing information from different engines, according to one embodiment consistent with the present invention.

In one embodiment, upon request by a user or equipment manufacturer, the program 110 of the present invention then accesses the storage device 113 and sends the stored pattern, in step 802, to the cutting/pattern device 402 having a controller 613 (see FIGS. 5 and 11), for processing, via a communication link 514, wireless 515, satellite transmission 210, etc., where the pattern is stored, on another storage device 205, such as a hard drive 205, by the user or the equipment manufacturer. The cutting device 402 uses the information in an application to cut the material using cutting arm 619 and develop the pattern (see FIG. 11).

Figure 7:
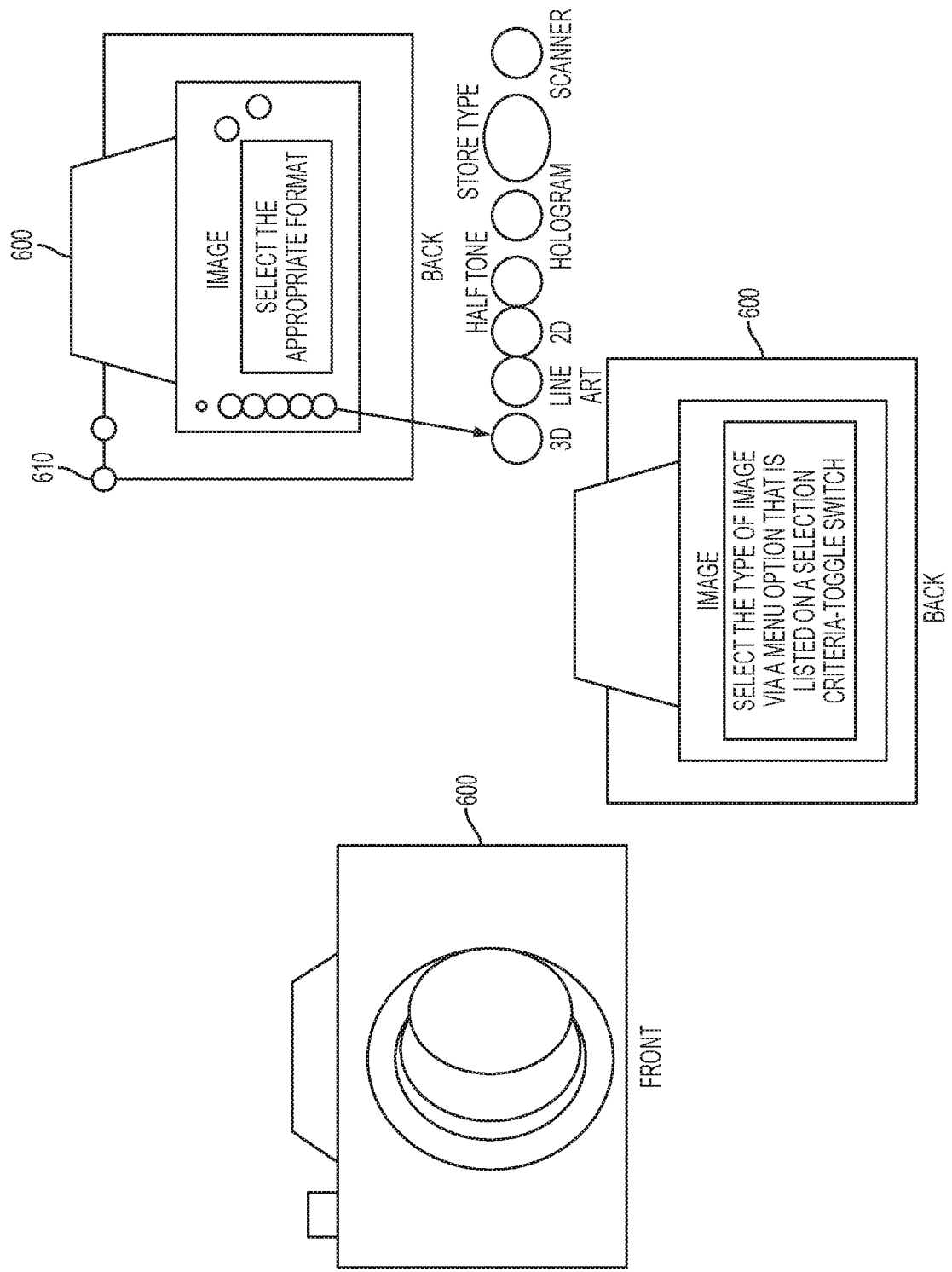
FIG. 7 is a schematic diagram of a camera with removable lenses or configurable lenses, according to one embodiment consistent with the present invention.
Figure 8:
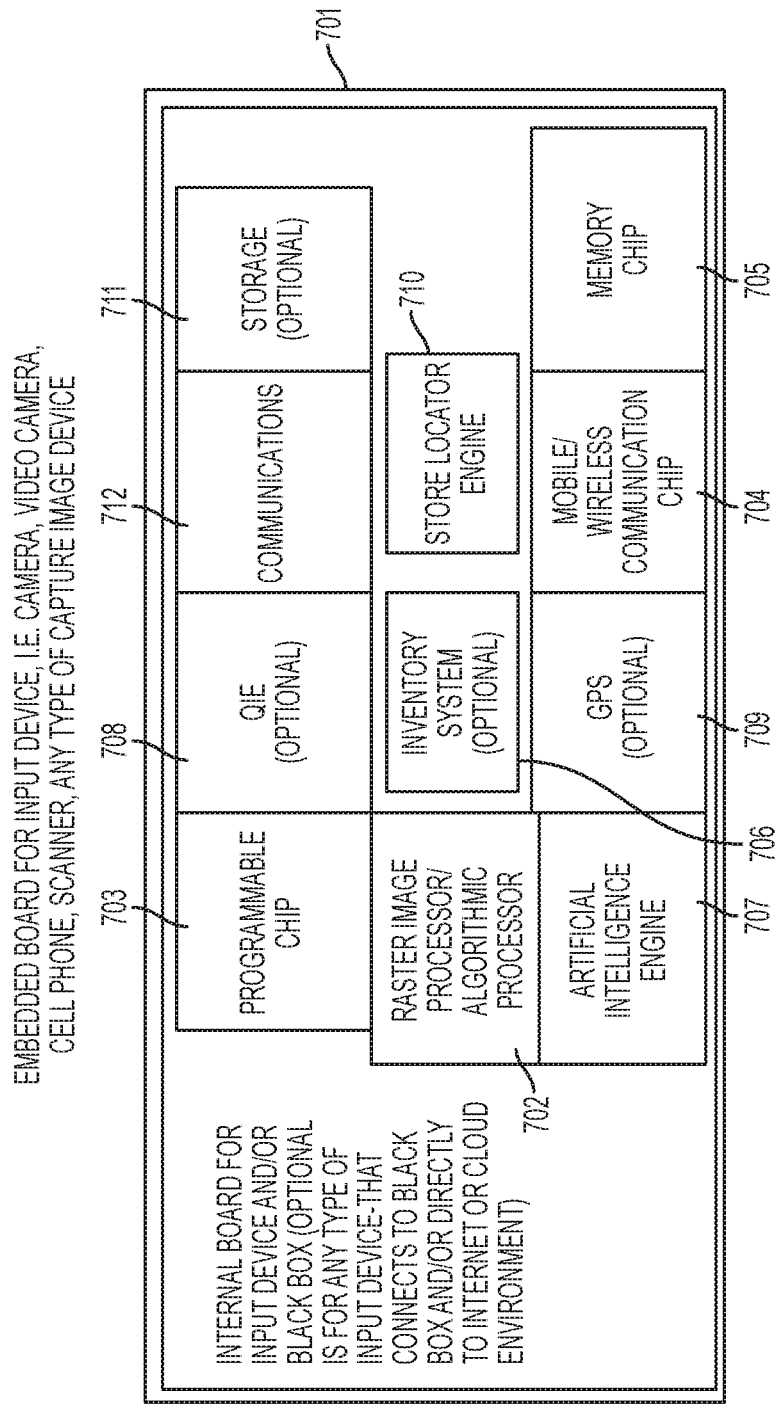
FIG. 8 is a schematic diagram of an Internal Board for an Input Device and/or Black Box, according to one embodiment consistent with the present invention.
Figure 9:
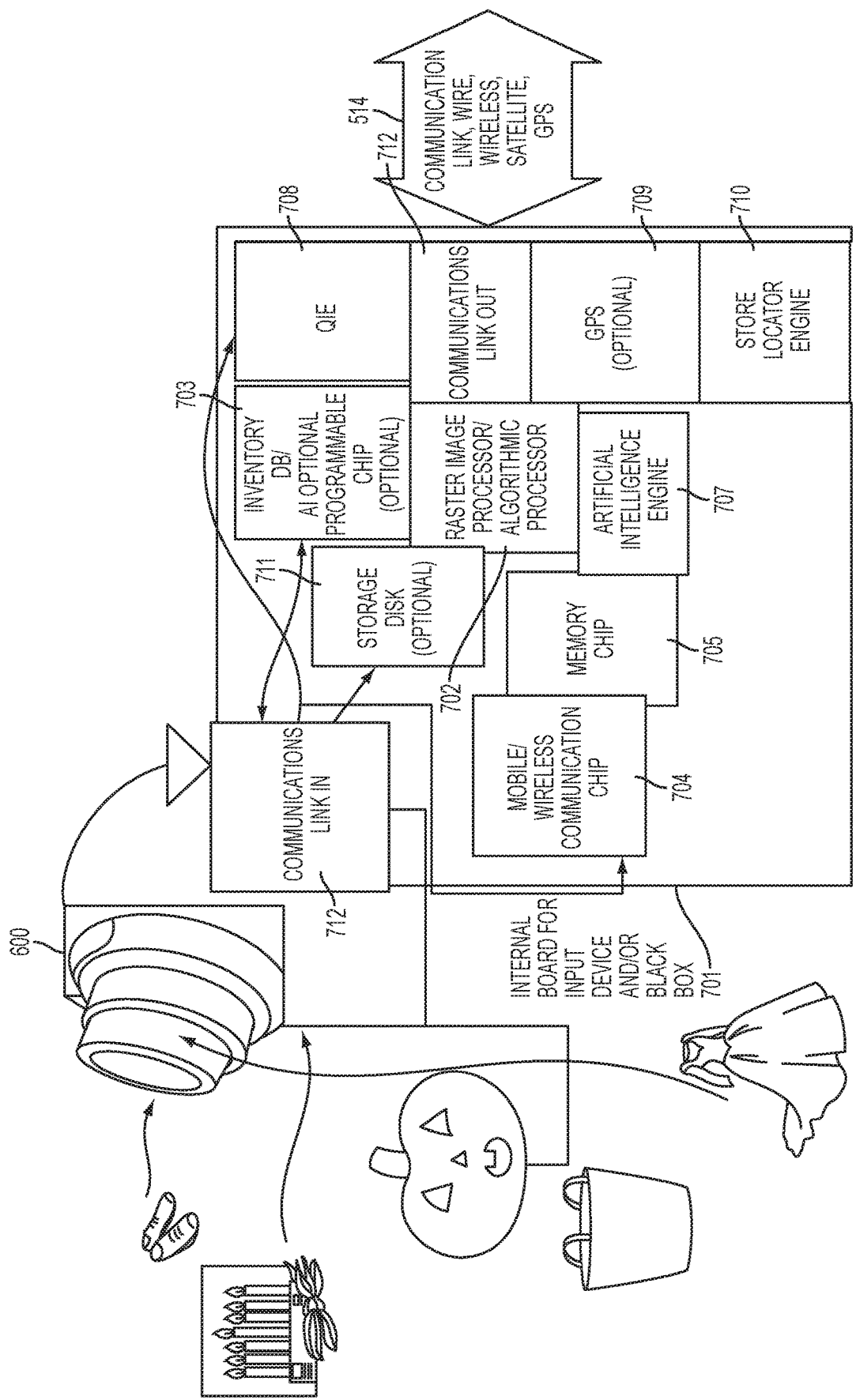
FIG. 9 is a schematic diagram of an input device which captures and processes images, according to one embodiment consistent with the present invention.
Figure 10:
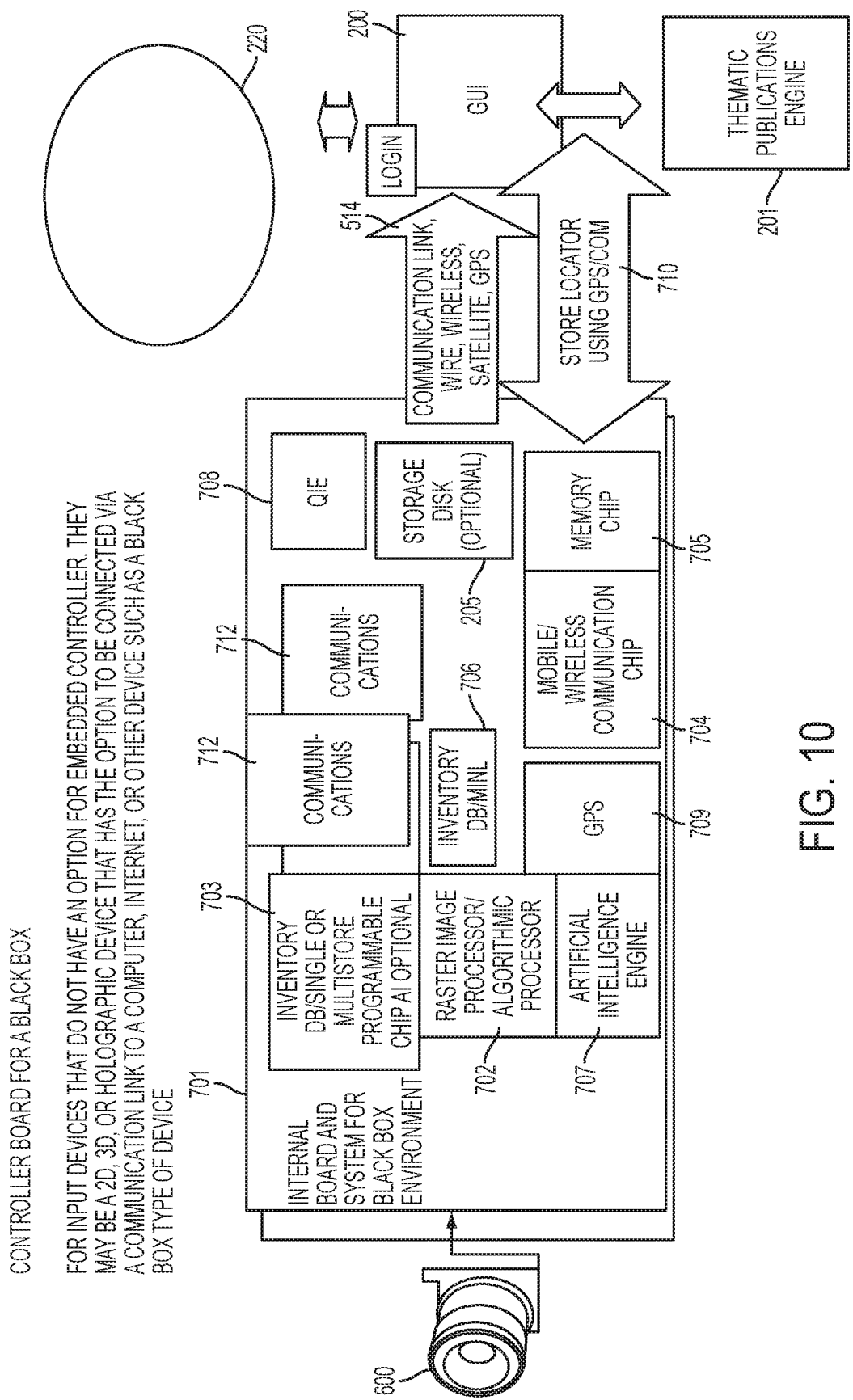
FIG. 10 is a schematic diagram of a Controller board for a Black Box for input devices that do not have an option for an embedded controller, according to one embodiment consistent with the present invention.

In one embodiment, the cutting device 402 of the present invention may be designed with a capture imaging device 600 and/or an intelligent sensor (see FIG. 7), and the program 110 captures the measurements or information as the pattern is being cut by a user, and stores that information on a storage device 205, or in a temporary storage area 711 (see FIGS. 8-10) of the capture imaging device 600 or sensor, in step 803, in the format of a 2D, 3D, 4D, 5D, hologram or other type of image, as well as half tone, line art, scanner, and store type capabilities.

In one embodiment, the capture imaging device 600 (see FIG. 7), used with the cutting device 402 or separately for any image capture functions, may be a camera, cell phone, video camera, or input device 104 with interchangeable lens and selection criteria. The capture imaging device 600 may have cropping, scanning, altering, blur-free, or other existing technologies, and selection buttons 610 for changing the lenses for imaging capture. The capture imaging device 600 may have selection criteria for the type of image via a menu option that is listed on a selection criteria/toggle switch at the back of the device 600.

In one embodiment, the capture imaging device 600 (see FIGS. 8-10) includes an internal board 701 (connecting directly to the internet 220 or cloud or via a black box), which includes a programmable chip 703, QIE 708, communications module 712 (in/out), raster image processor/algorithmic processor 702, artificial intelligence (AI) 707, inventory system (optional) 706, GPS (optional) 709, store locator engine 710, mobile/wireless communication chip 704, memory chip 711, and storage 711 (optional). The capture imaging device communicates via communication link 514 to other devices, such as the GUI 200, and the thematic publications engine 201 (see FIG. 9-10).

Figure 13:
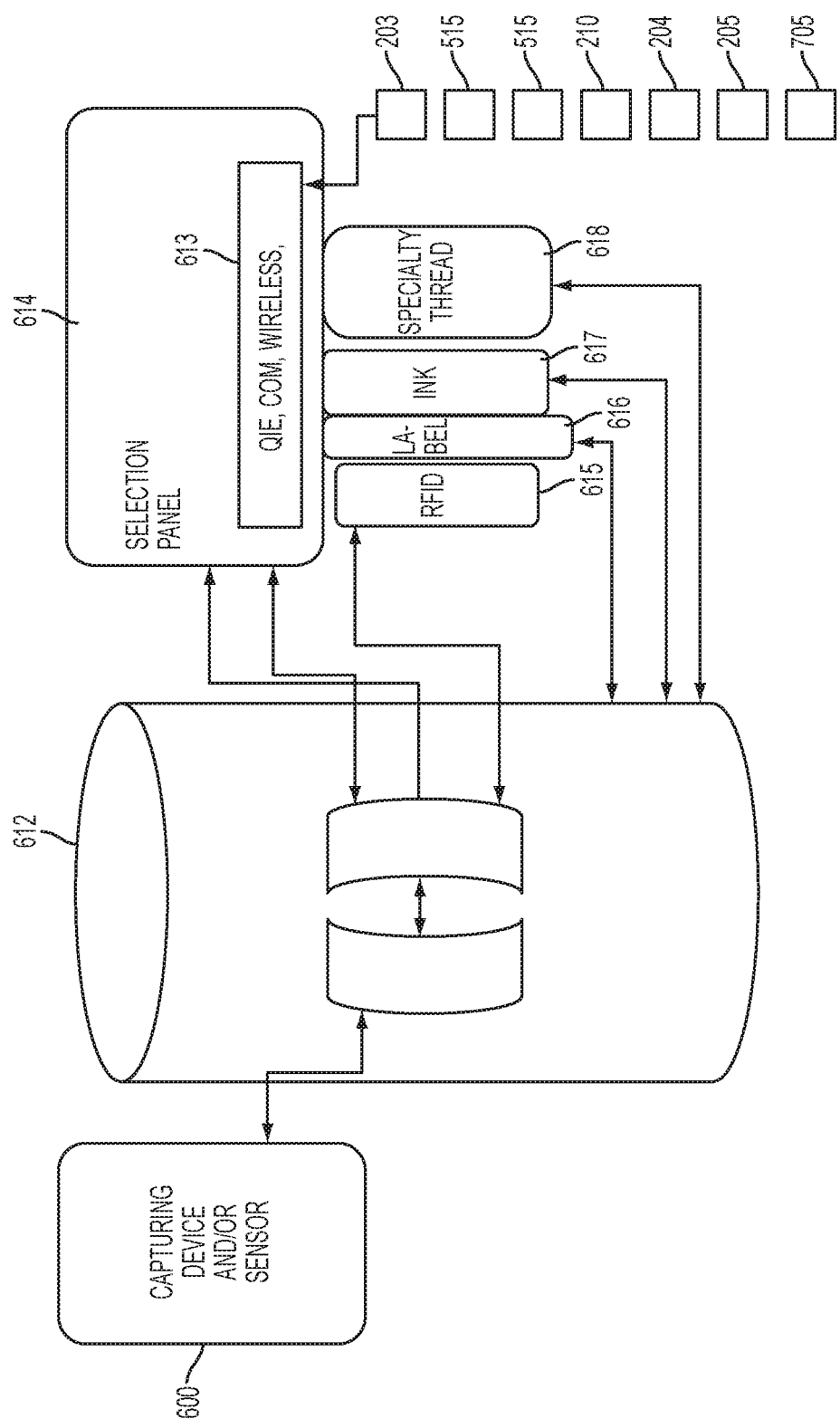
FIG. 13 is a schematic of a blow molding machine for shoes embedding an intelligent sensor, imprinting arm/needle, and an embedding device to determine the size, embed an RFID chip, and or imprint bar code or other ID information during the manufacturing of merchandise, goods, etc., according to one embodiment consistent with the present invention.

The program 110 of the capture imaging device 600 submits the captured information during pattern cutting, directly via a communication link 514 or wireless 515 and in some cases, satellite transmission 210 to an enterprise resource planning (ERP) system 400 (see FIGS. 2, 5 and 11), in step 804, or to another device or system which processes that information for further use, such as a sewing machine 611 (see FIG. 12), footwear assembling and/or sewing machine, blow molding device 612 (see FIG. 13), etc., each having a selection panel 614 and controller 613, and a storage device 205 where the information is stored.

In one embodiment, the QIE engine 203 (see FIGS. 11-13), which may be located on a black box 701 (see FIG. 12), on the client system 100, or in the image capturing device 600 (QIE 708 of FIGS. 8-10), on the world wide web (WWW), and in some instances, depending on the intelligent sensor, incorporated in the sensor, performs the processing on the captured information in this or another application.

In one embodiment, with respect to soft goods, the program 110 processes the cutting measurements or mapped data saved in the storage 205 or 711, into an image, ID, label 615, or RFID chip 616, ink 617, specialty memory thread 618, or bar code developed with specialty ink 617, which is added by the user to the sewn material in step 805, as a type of code sizing, or actual sizing, of the cut piece. These images, chips, threads etc., contain the embedded measurements of the sewn material or produced goods at the completion of the sewing process.

Figure 4:
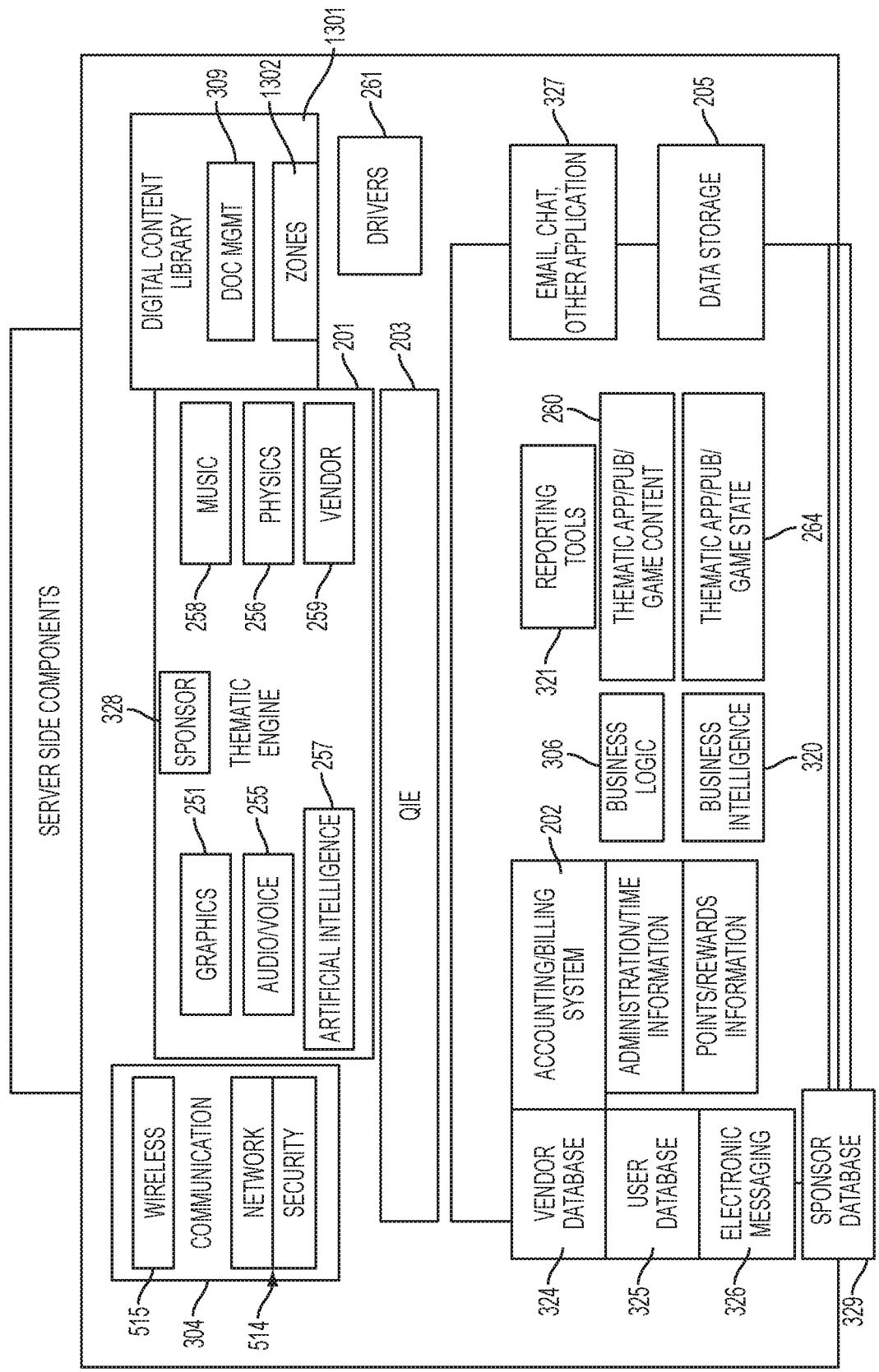
FIG. 4 is a schematic diagram of server side components, according to one embodiment consistent with the present invention.
Figure 5:
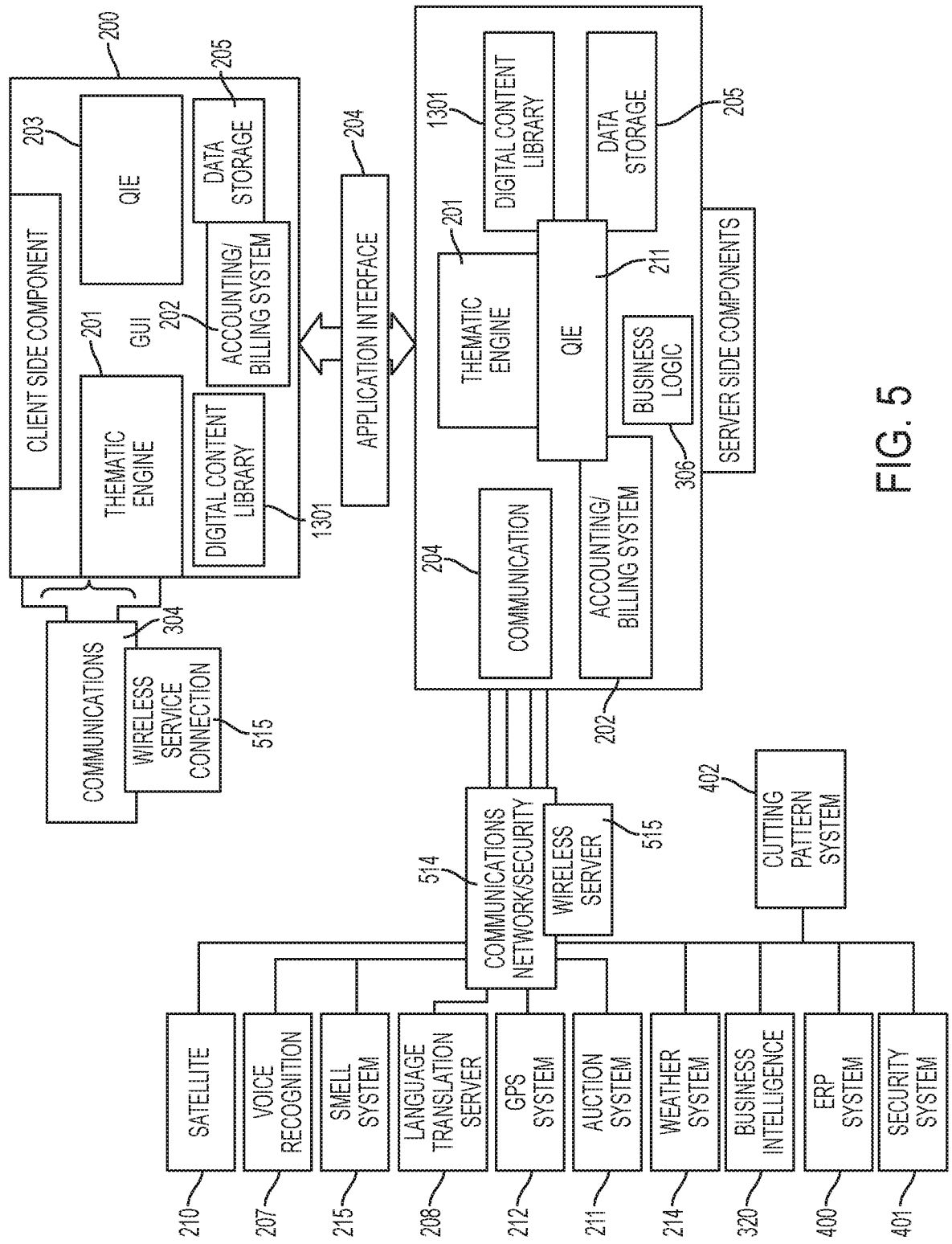
FIG. 5 is a schematic diagram of a client and server with major components, according to one embodiment consistent with the present invention.

In one embodiment, the program 110 of the present invention automatically tags the captured image(s) from the capture imaging device 600 or sensor during or after the above processing with an ID/Code, in step 806 (see FIG. 6), and all the measurements are compiled by the program 110 using an AI system 707 and stored with the image in a temporary storage area 711 of the capture imaging device 600 or sensor, memory chip 705 (see FIGS. 8-10), or in a storage device 205 at the client or server (see FIGS. 4-5).

In one embodiment, in the cases where the ERP 400 is not capable of accepting the format of the image, the image will be sent by the program 110 to an interpreter module (i.e., QIE engine 203) for conversion, or interpretation, formatting, and processing, and thereafter, the image will be sent in the appropriate format to the ERP system 400 to be processed appropriately.

In one embodiment, where hard goods such as luggage, glasses, etc., are produced, the program 110 may send the design or pattern to a molding device 612 or other system (see FIG. 13), where the program 110 develops a mold from the pattern in step 807, to make more of the same item at the exact size, width, dimension etc. During this process, the capturing image device 600 and/or an intelligent sensor captures the image data as it is being developed or manufactured. The image data is then processed in the QIE engine 203, as noted above, and the captured data and image is tagged with an ID/Code in step 806, which includes all the measurements compiled and stored with the image.

Thus, during or upon completion of the manufacturing and development process for both hard and soft goods, a bar code developed with specialty ink 617, image, ID label 616, or RFID chip 615, or specialty memory thread 618, will be added by the program 110 to the manufactured/produced material that has the embedded measurements and the ID/Code in steps 805 and 807, and the images tagged and stored in step 806. The information will be stored by the program 110 in a storage device 205 or 711 etc., in a 2D, 3D, 4D, 5D, hologram or other type of image format, or may be submitted directly via a communication link 514 or wireless 515 and in some cases satellite transmission 210 to an ERP system 400, and may be sent to the QIE engine 203 or another application, for further processing.

In each of the above embodiments, the data and images captured, can be sent directly by the program 110 to the QIE engine 203 and processed for use in a thematic application, business application, inventory system, or for further processing by the QIE engine 203 based on the instructions provided.

The goods may be processed in steps 805 and 807 as described below and shown in FIG. 14.

Figure 14:
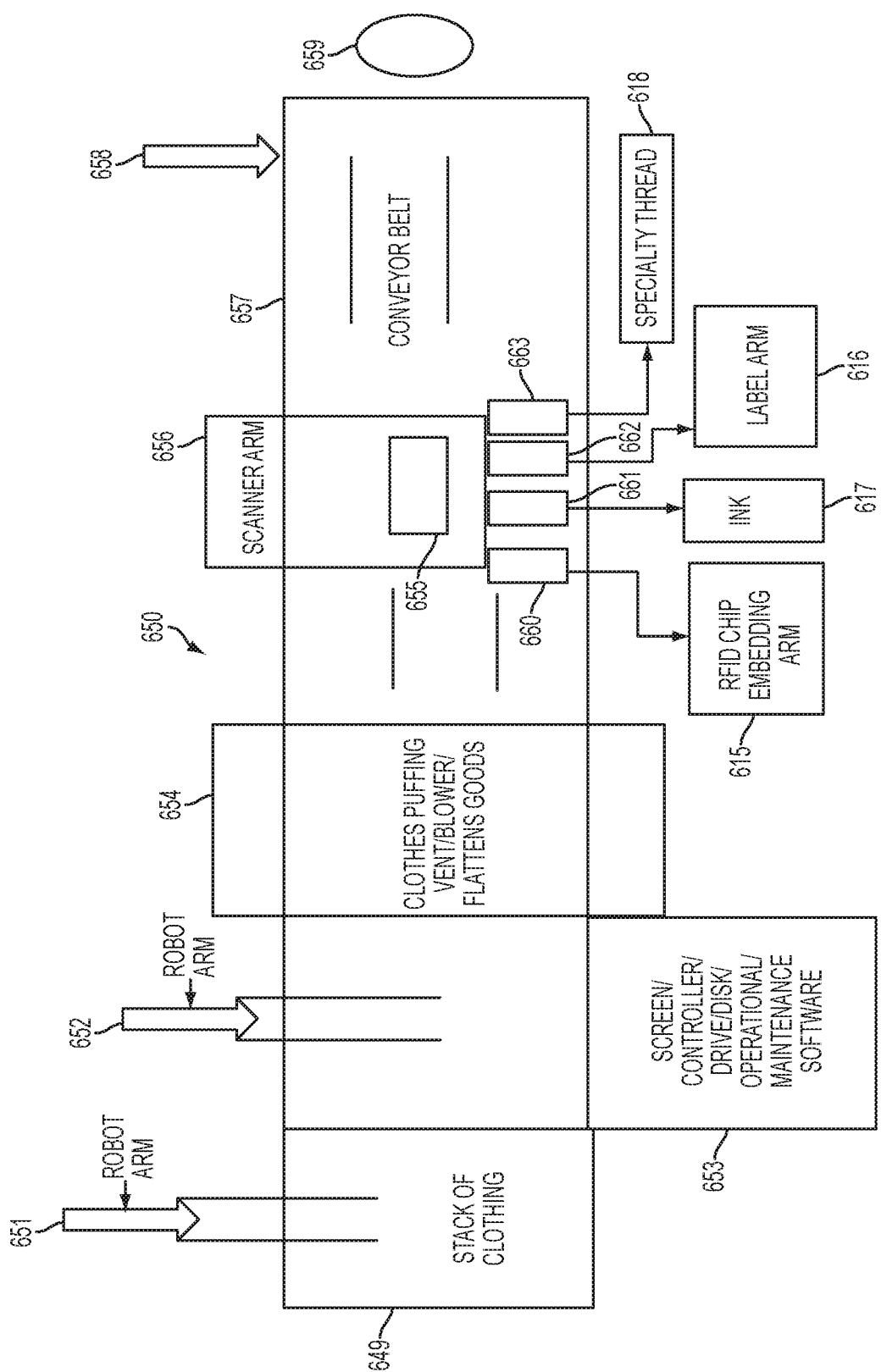
FIG. 14 is a schematic of a conveyor and blower device for clothing using robotic arms with arms, bars or specialty equipment for embedding special ink for ID, Chip, Specialty Thread, according to one embodiment consistent with the present invention.

In one embodiment, in a tagging/ID system, a stack of completed items 649, such as clothing, goods, merchandise, footwear, etc., are placed on an industrial conveyor system 650 that has, for example, robotic arms 651, 652, and a screen/monitor, and black box 653 including a drive/disk, and operational and maintenance hardware and software (see FIG. 14).

In one embodiment, the robotic arms 651, 652 receive their instructions from the program 110 and each pick up one piece of clothing or article, singly, and places the item on the conveyor belt 657.

In the case of soft goods, such as clothing, the conveyor system 657 may have a puffing/vent/blower system 654 that flattens the clothing and stretches it.

In one embodiment, a robotic/electronic arm/image capturing system/scanner 656 scans over the completed goods, merchandise, or article, and utilizing an intelligent scanner/intelligent sensor, scans and collects the information (i.e., images, data) from the entire completed merchandise or goods, and saves it to a storage device in black box 653 or other storage 205 (see FIG. 4).

In one embodiment, the robotic/electronic arm/scanner 656 includes a measuring light box 655 or some type of box which includes a disk drive, wireless chip, controller, communication link and a QIE engine and/or an embedded QIE controller. Depending upon the size of the box 655, the program 110 scans the merchandise or goods on the conveyor belt 657, captures the images, and stores same in black box 655 or 653.

In one embodiment, the program 110 calculates the measurements of the goods using an algorithm, or processes the measurements in the QIE engine, and develops a final ID/code for security purposes, and the robotic/electronic arm/scanner 656 embeds that code into the merchandise. The robotic/electronic/scanner arm 656 includes one or more of a scanner, intelligent sensor, an RFID chip embedding device 660 which embeds an RFID chip 615, ink embedding device 661 which embeds specialty ink 617, label device 662 which embeds a label 616, symbol, or other type of technology, or code, and/or specialty thread embedding device 663 which embeds specialty thread 618 into the merchandise, etc. The robotic/electronic arm/capture image device/scanner 656 includes one or more of the embedding devices 660-663 to operate on, sew, glue, and permanently label the goods or merchandise, as well as to capture and store the images thereof.

In one embodiment, after measurement and labeling, the merchandise is then seized at the end of the conveyor belt 657 by a robotic/electronic arm 668, which moves the merchandise to a container, and/or caught by a basket 659 or some other type of container at the end of the conveyor belt 657, that catches the final product to be sent to distribution and inventory.

Figure 15:
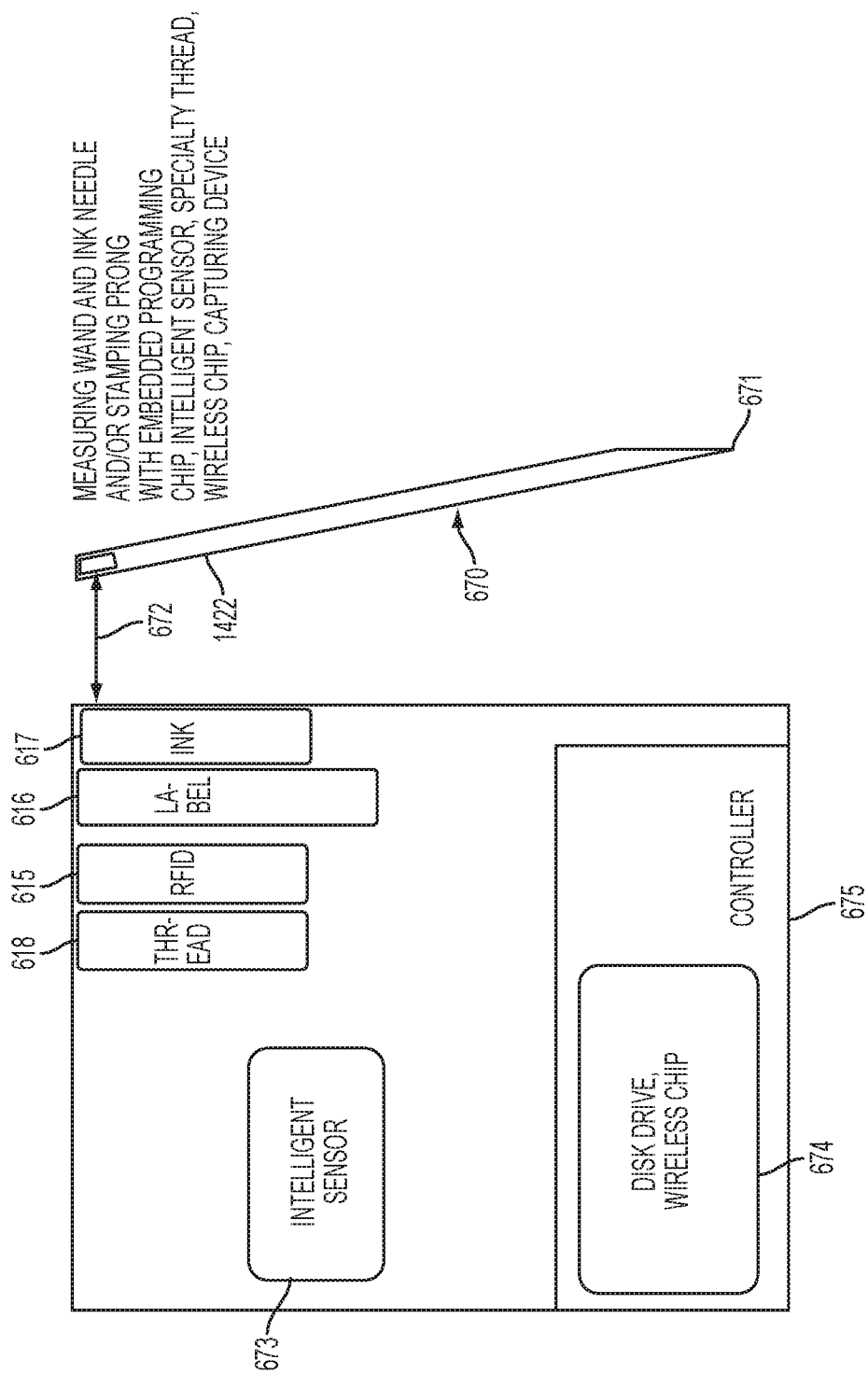
FIG. 15 is a schematic of a measuring wand for merchandise sewn that reads and processes the measurements, storing the measurements into an embedded RFID chip, Label, Special Ink or Specialty thread via an intelligent sensor and transmits, or manages the system for inventory purposes, according to one embodiment consistent with the present invention.

In one embodiment, instead of using a robotic/electronic arm/scanner 656, a measuring wand 670 (see FIG. 15) with an ink needle 671 is used, with a stamping prong or embedded chip 672 and intelligent sensor 673, including a wireless chip 674, controller 675, with embedded programming for these devices, including an embedding device for embedding an RFID chip 615, specialty ink 617, thread 618 or label 616, which make up the wand 672. The wand 672 may be, in some cases, part of an input capturing device 600.

In one embodiment, the wand 670 is used to scan the merchandise 649 by hand, and embed the clothing/goods with a final ID or Code with the final measurements. The size of the merchandise is determined by the program 110 calculating all the angles, and using a mapping mathematical formula into a standard size.

The final ID/code with image, after processing, is then sent wirelessly by the program 110, from the black box 653, 655, or storage 205, to an ERP system 400, inventory image system 1200, and to a QIE engine 203, thematic application 201, or other system for processing, storage etc. (see FIG. 16). The image will be either in a 2D, 3D, 4D, 5D image, hologram or other format.

The inventory image system 1200 (see FIG. 16) makes the images from input devices 600 available to the store locator engine 710, which is connected to a GPS 212, and allows a multi-store location inventory image system 660 to access the store and manage the inventory therein, including utilizing the 2D or 3D removable tagging engine 1305 to tag inventory items, using GUI 200. Other systems may be accessed (see FIG. 17), including a retail training application merchandizing engine 1304, ticket creation engine 1306 for ticketing items, a mark up/down engine 1308 for marking up/down inventory, a barter engine with chat and voice recognition 1309 for online customers, a polling engine 1303 which checks inventory items, an internet billing system 1312 and application accounting/billing system 202, as well as an auction site engine 1310 for auctioning items, and a security system 401 to manage security of the operations.

Thus, in one embodiment, the present invention tracks the sizing of the merchandise 649 as it is being manufactured, by capturing, storing, and submitting the data to an application or inventory system 1200 for rendering (see FIGS. 14 and 16), and merging data for each and every piece of merchandise 649. Thus, anyone who is designing and manufacturing goods has the ability to manage the goods and merchandise being manufactured, as well as anyone who wants to purchase the goods, now has a system that allows them to try on the ID/coded merchandise from a virtual environment. Consequently, a user can track, and purchase goods from a virtual closet, try on clothing in a virtual mirror, environment or device, and track the goods via global positioning system (GPS) and satellite, using the radio frequency identification (RFID), metallic thread, metallic inks, specialty inks, barcodes, intelligent sensors, or other types of security embedded for tracking components of the merchandise as it is being manufactured.

In one embodiment the information is translated from one language to another (i.e., non-English language), in the language specified by the individual, or by the designer, to the individuals cutting, sewing, producing, manufacturing, the merchandise, goods, apparel, footwear, etc., as well as those who are purchasing goods from a foreign country, or a storefront owner/sales person who does not speak the language understood by the user.

Figure 18:
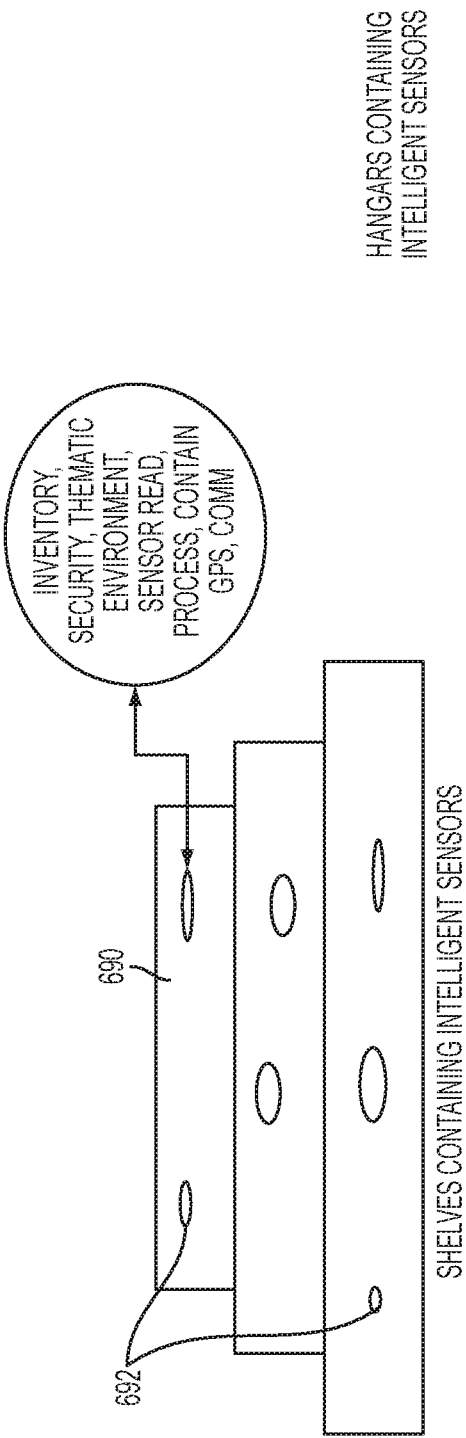
FIG. 18 is a schematic of a shelf containing intelligent sensors reading the label, tags, ink, specialty thread, RFID, chip, for capturing and displaying the sizes of the merchandise, number of goods on the shelf, vendor, price, and other information stored in the system database, according to the embodiment consistent with the present invention.
Figure 19:
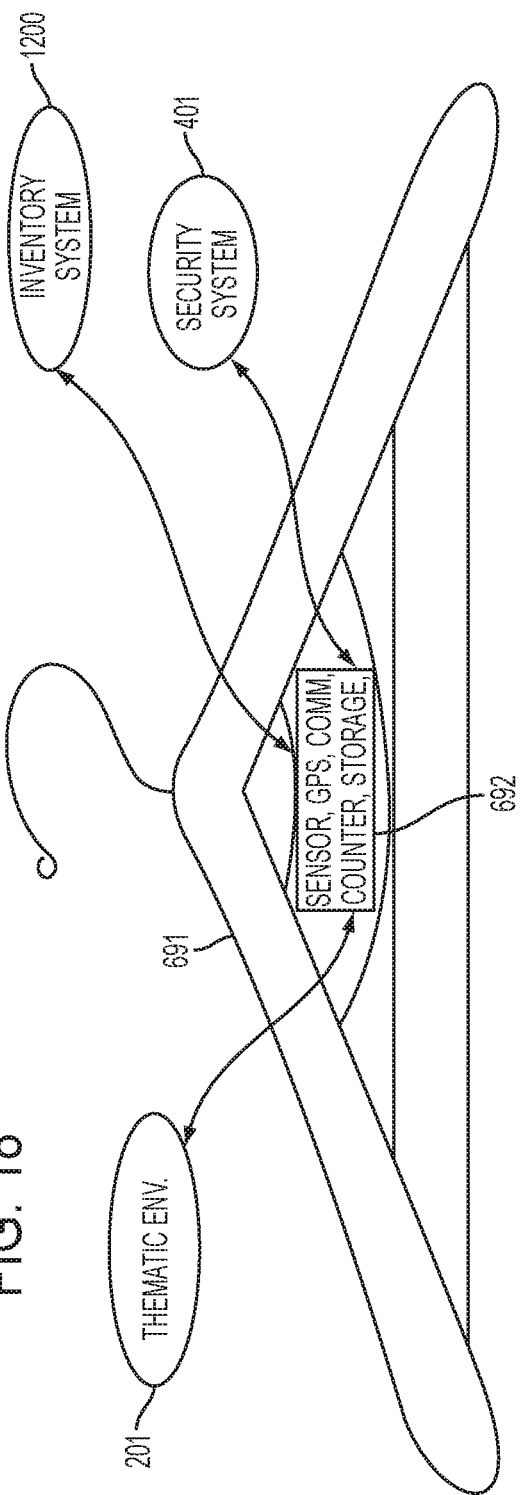
FIG. 19 is a schematic of a hangar containing an intelligent sensor, GPS, COMM, which reads the label, tags, ink, specialty thread, RFID, chip, captures and displays the sizes of the merchandise, provides the number of goods on the shelf, vendor, price, and other information stored in the database of the system, according to the embodiment consistent with the present invention.

In one embodiment, once the goods have been marked with a final code, the goods are shipped to a store, or the image containing the final ID/code is placed by the program 110 in inventory in a digital or virtual store, location, or other area. For clothing, the merchandise could be hanging on an electronic shelf 690 (see FIG. 18) or an electronic hangar 691 (see FIG. 19). The electronic shelf 690 and electronic hangar 691 have intelligent sensors 692 or embedded applications that obtain, read, and process the ID/code of the merchandise, all of its attributes including the size/measurements, and displays that information for the user on an electronic device 104.

Figure 16:
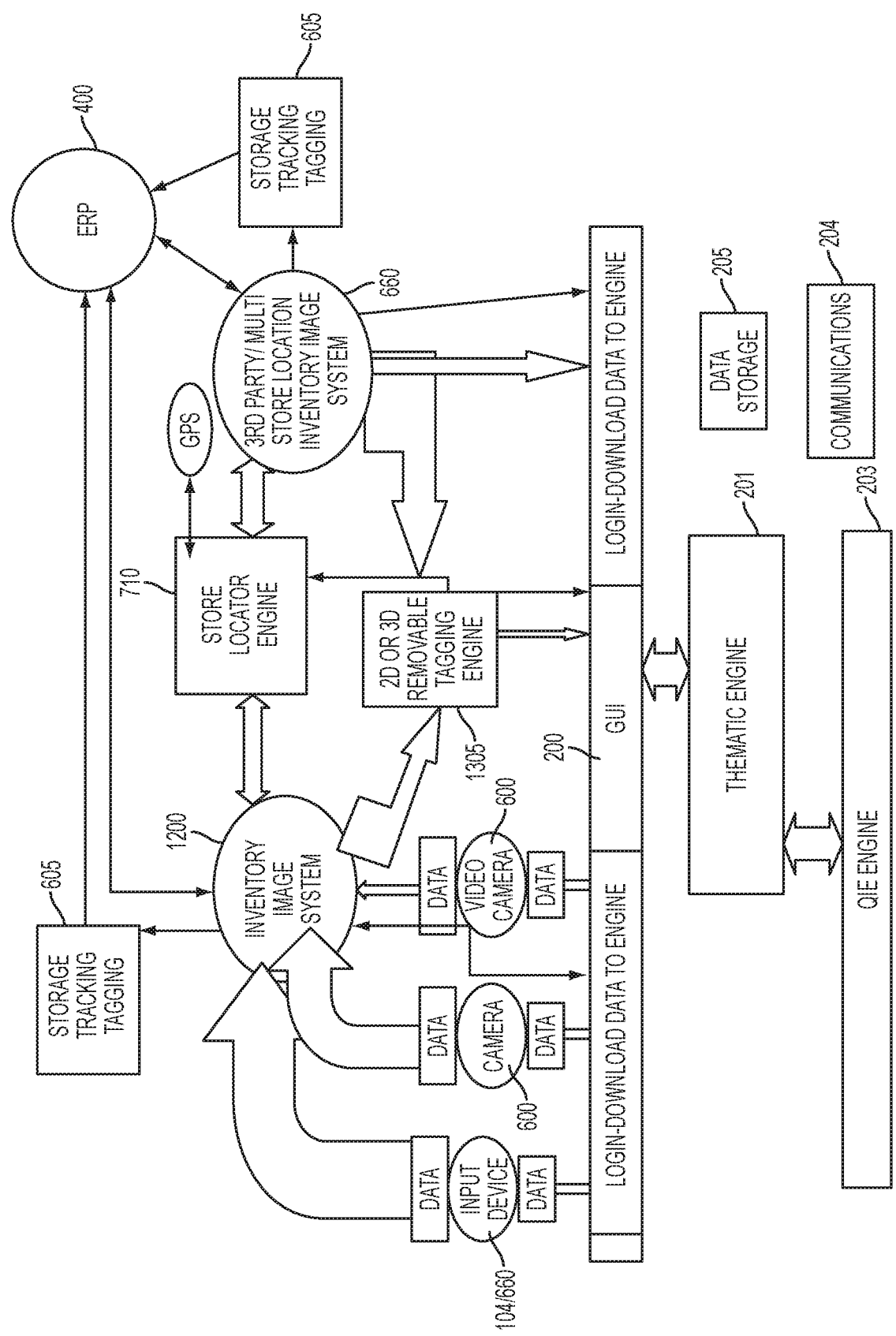
FIG. 16 is schematic diagram showing how captured images are taken and transferred to either an inventory system for ticketing and then to a tagging system, or directly to the processing engine for storage, processing or both, according to one embodiment consistent with the present invention.
Figure 17:
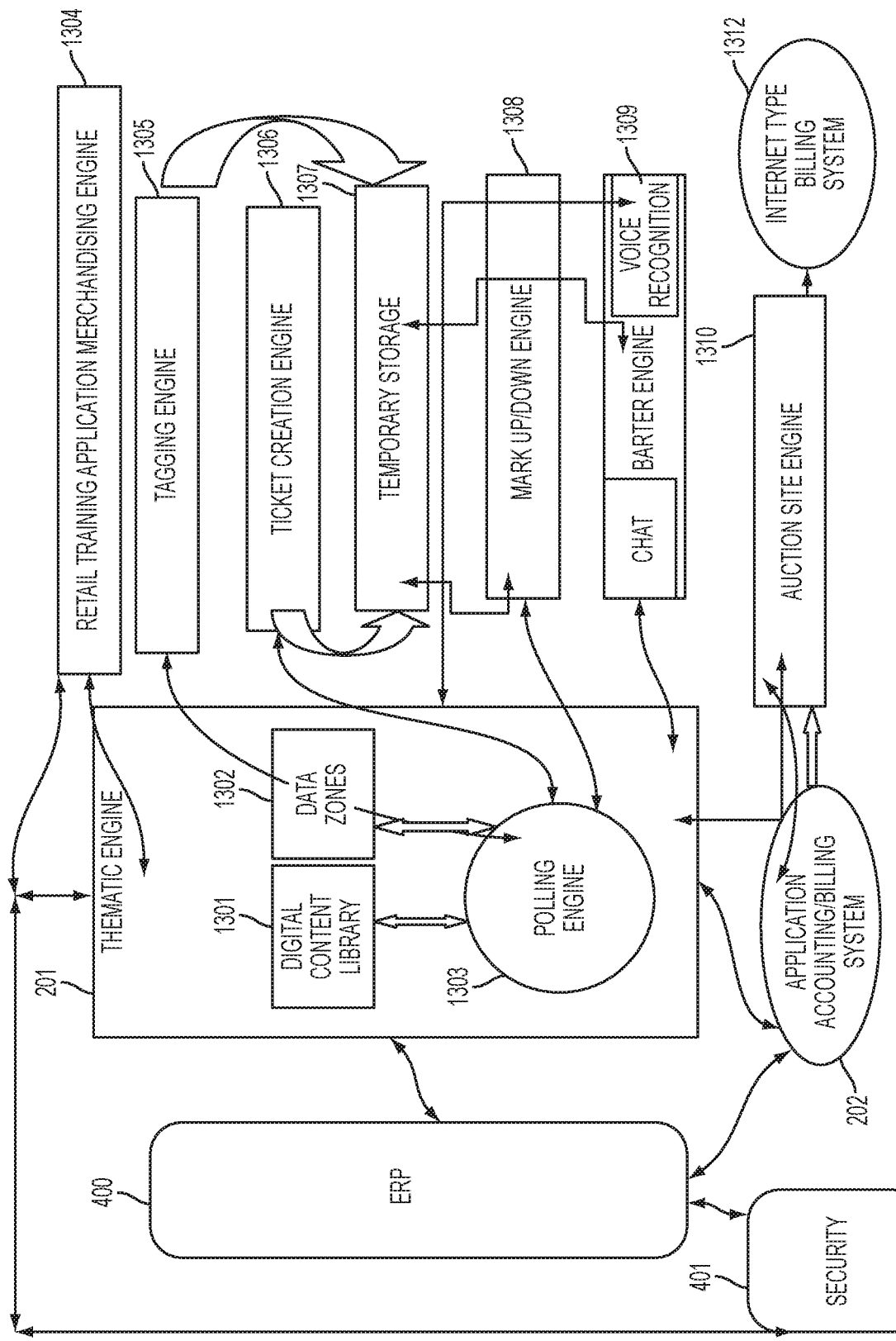
FIG. 17 is a schematic diagram of the thematic application environment connecting to and processing information from different engines, according to one embodiment consistent with the present invention.

In one embodiment, the digital ID or ink 617, label/code 616, thread 618, RFID chip 615, etc., is tracked by the program 110 in the inventory system 1200 (see FIG. 16). For security purposes, the codes 615-618 are read by an intelligent sensor booth, hand held, or other device 104 as the merchandise leaves manufacturing (or retail) location/building, and the program 110 will send a signal to the main inventory system 1200 for tracking purposes. If the merchandise was removed without being purchased at a retail location, the program 110 would sense the ID/code as it leaves the store, with a type of flashing color code, some other code, or type of security flag, that provides an alert on a monitor, cell phone, digital screen, dashboard or other system, that the merchandise was removed and not purchased. The codes can be activated by the program 110 to locate the merchandise using a GPS signal or satellite transmission, and can provide all specifications of that merchandise to a user.

In one embodiment, the present invention includes an apparatus and method for sizing merchandise on a person's virtual body, in order to purchase goods that will fit the individual's body at the time of capturing the person's physical measurements.

Specifically, in one embodiment regarding footwear, a sock, stocking, slipper, or some type of foot covering made up of stretchable, breathable material that contains specialty threaded sensors, labels, or threads etc. 615-618, when placed onto the foot and ankle, captures the measurement of the foot and ankle and transmits this information via a wireless connection from an electronic device 104 (i.e., scanner for a computer, PDA, etc.) to a storage device 205 such as a hard disk, mini disk, portable disk application, in an inventory system 1200, for processing (see FIG. 16).

Similarly, in one embodiment, a piece of clothing covering at least part of the end user's body, if not the entire body, and made up of a stretchable breathable material that contains specialty threaded sensors, or threads, labels 615-618 etc., and optionally a temperature mechanism, when placed onto the body, will mold to the body and form and capture the person's size in each area such as the upper arms, wrist, ankles, legs, upper torso, etc. The labels, threads and/or intelligent sensors 615-618 will capture the person's measurements and transmit this information via an input device 104, via a wireless connection to a storage device 205, such as a hard disk, mini disk, portable disk, or online inventory system 1200 or application, for further processing.

The sizing information is sent by the program 110 directly to the thematic environment 201 to determine where the information should be forwarded for processing (see FIG. 16). If the information needs further processing or formatting, the information will be sent to the QIE engine 203 to the appropriate entity (i.e., ERP 400, etc.). If the information captured is in the correct format, the information may be stored by the program 110 in a storage device 205, then in one embodiment, sent to designer for "merchandise on demand", such as an "on demand shoe", for example, or to a local storage device 205 or database that is managed by the user, for future use.

Figure 20:
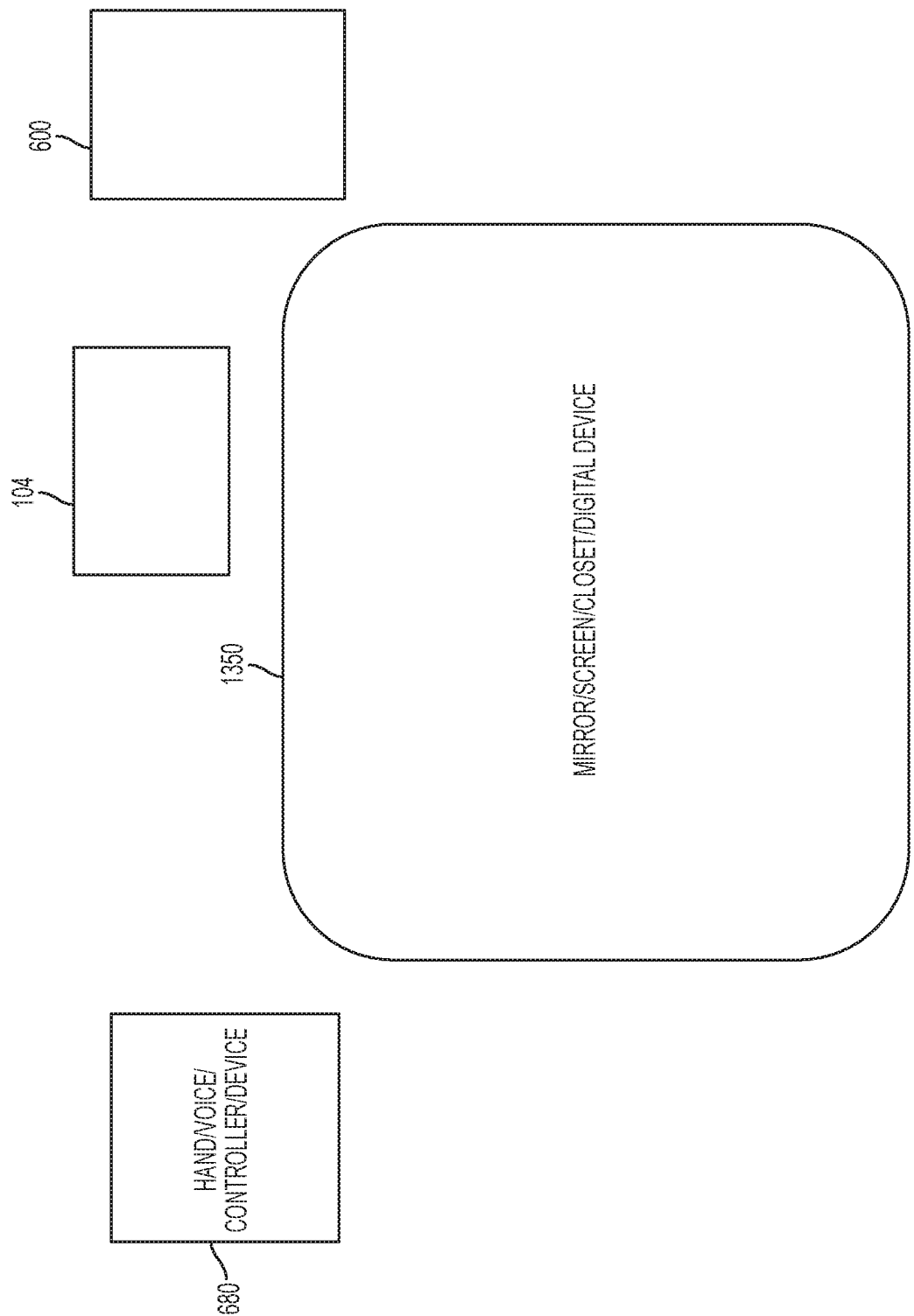
FIG. 20 is a schematic diagram of the environment that a user may be logging into, according to one embodiment consistent with the present invention.

In one embodiment, the user can create an avatar of themselves by exposing their image to an image capturing device 600 or set of devices (i.e., sensors) embedded either in a digital closet, mirror, stand, store, screen 1350 (see FIG. 20), or any other area that the image capturing device 600 is located and can be activated. The program 110 calculates the size of the avatar as the image capturing device 600 and/or devices scans the user's body to calculate their measurements. The measurement information is sent by the program 110 via a wireless connection to a storage device 205, such as a hard disk, mini disk, portable disk, or online inventory system 1200 or application, for further processing.

Figure 21:
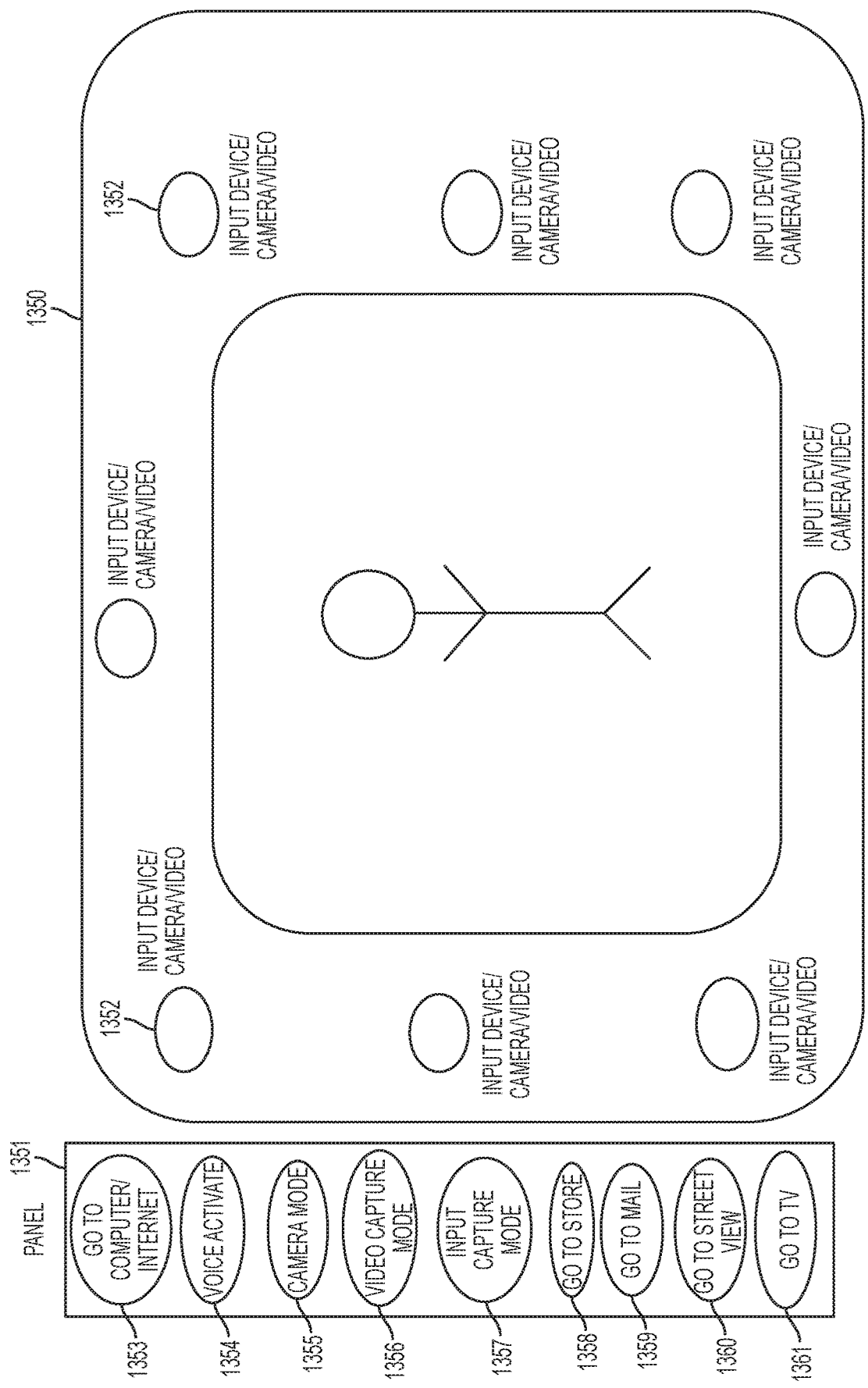
FIG. 21 is a schematic diagram of a screen, mirror, digital device and panel that the user may be presented with or use, according to one embodiment consistent with the present invention.

In one embodiment, the digital closet, mirror, stand, store, screen 1350, includes buttons 1352 which provide connection to an input device 104 or image capturing device 600 (see FIG. 21). In one embodiment, the digital closet, screen, mirror, etc. 1350 includes a panel 1351 which provides buttons for access to computers and the internet 1353, provides for voice activation 1354, camera mode 1355, video capture mode 1356, input capture mode 1357, access to a store 1358, to a mall 1359, to a street view 1360, and to TV 1361.

In one embodiment, the user can log into the inventory system 1200 from a computer, cell phone, tablet, or other electronic input device 104 or image capturing system 600 (see FIGS. 16 and 18), and using their calculated measurements, or measurements calculated for their avatar, search for goods, merchandise etc. desired. This is carried out by the user inputting their specifications/measurements, designer/maker, color, price etc., into the inventory system 1200 to locate and match merchandise therein (see FIG. 16), containing the calculated measurements that were captured and stored from the manufacturing process. In one embodiment the user can use voice commands, written commands, touch screen or other type of intelligent sensory activity, including brain interface/mind control 680, to instruct or activate the equipment 104, 1200 for purposes of finding the goods by vendor, size, color, shape, specification, price, location, etc. The images accessed from the storage device 205 may be in the form of 2D, 3D, 4D, 5D, video, or any other type of format required or searched. In one embodiment, the program 110 managing the inventory system 1200 will send a signal to the store locator engine 710 (see FIG. 16) locate the goods/merchandise via a GPS locator 212 and locate the goods for viewing and purchasing by the user. Depending upon the instructions provided by the user, the information regarding purchasing etc., will be processed through the thematic application 210, inventory system 1200, and/or QIE engine 203.

Figure 22:
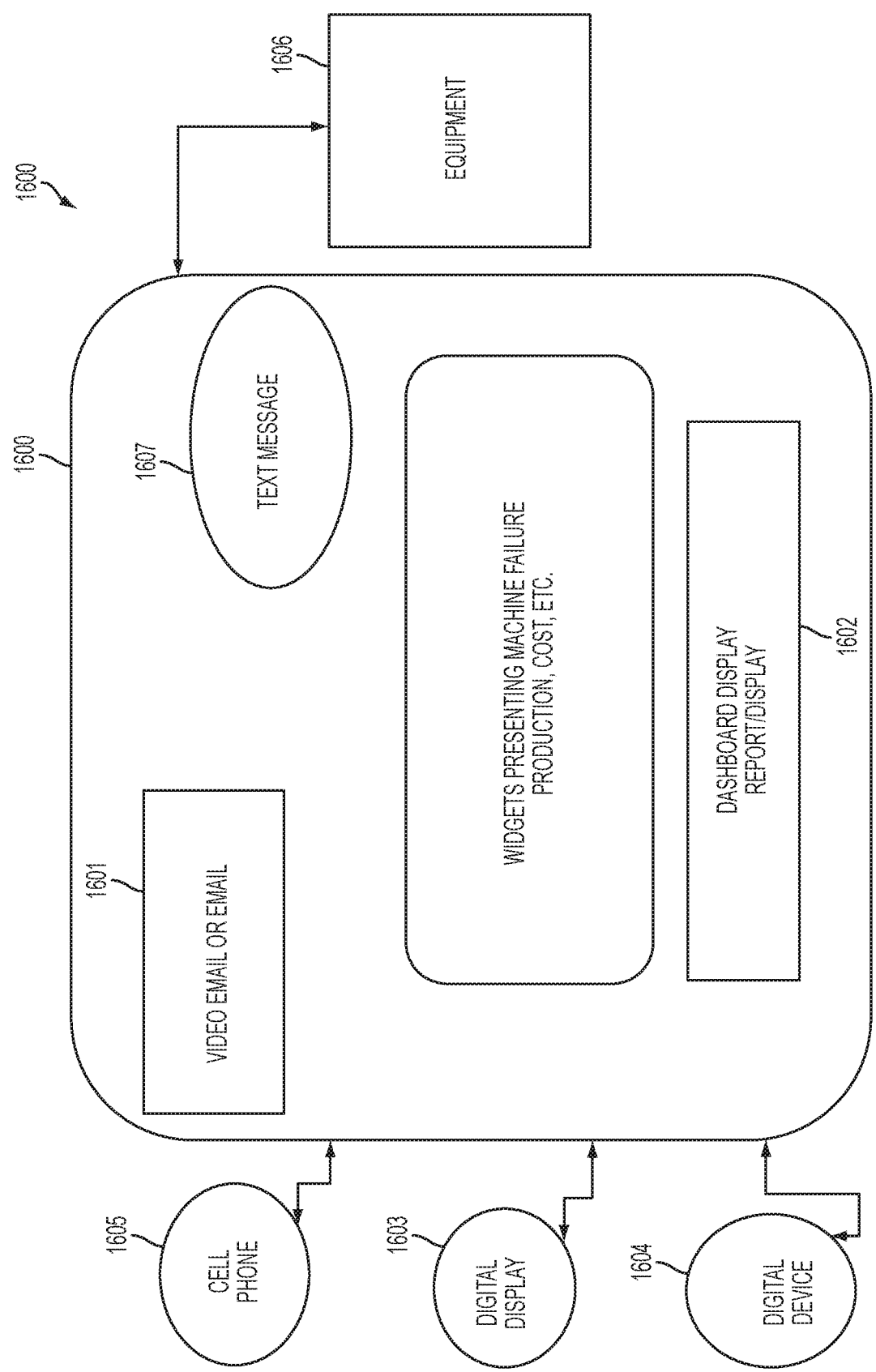
FIG. 22 is a schematic diagram of a screen, cell phone, computer screen, or other electronic device processing and displaying information provided by the different manufacturing equipment displaying failure, cost, downtime, number of pieces produced and other data, according to one embodiment consistent with the present invention.

In one embodiment, the present invention provides a system to manage production or manufacturing, and inventory of merchandise. In one embodiment, a system for managing goods, merchandise, clothing, or footwear, has the option of the program 110 running a monitoring application on a digital device 1600 that receives information from intelligent sensors etc., that tracks equipment 1606 failure, the number of pieces or goods manufactured, the type of goods manufactured, the time taken for production, any fault in production, downtime, the cost of the produced goods, and any other relevant information (see FIG. 22). This information can be sent by the program 110 (by satellite, internet, or other communications), via an email 1601 or text message 1607, or to a dashboard display 1602, or externally to a computer or display screen 1603, other digital device (PDA, controller board, etc.) 1604, or cell phone 1605, etc.

The program 110 of the present invention is loaded onto client 101 or server 120 systems that have applications and/or disk drives. For those systems 101, 120 that do not have the applications or disk drives, a small electronic device 104 would include a program 110 that collects the information from the intelligent sensors of the equipment 1606 processes and displays the information, and/or transmits the information via wireless communications, satellite transmission or direct connection to a server 120 and or QIE engine 203, that processes the information. The information is then communicated by the program 110 via email, text, phone, dashboard, image to the operator of the equipment 1606, or the user.

In one embodiment, the present invention may be used by an end user in a virtual environment. In one embodiment, the user may utilize the program 110 in shopping online or in a virtual environment either from their virtual closet 1350 (see FIGS. 20-21), computer environment 104, cell phone 104 or 1605, or in a physical store location and browse for goods that are sorted by vendor, price, style, cut, size, and/or a combination of the elements.

In one embodiment, the user is exposed to a virtual street view of a city and is able to enter any virtual store displaying only the merchandise requested by the user by designer/maker, size, color, and any other attributes selected or requested by the user to view and purchase goods.

In one embodiment, the user is exposed to a personal (online) catalog of the goods requested, or selected by the user for viewing and purchasing of goods. The catalog would be provided as a user-designed online/virtual store specifically populated with inventory suitable for the user (or requested by the user), based on the user's specifications, or a store or business that has a current location in the physical world displaying the current real-life inventory. The user's merchandise selection process can be conducted via user voice-activated commands, user entering/inputting selection criteria into a digital input device 104, by motion control, brain/mind control activation, and other type of interactive selection processes.

To enter the virtual store, the individual logs into the client 101 via input selection, or voice recognition by speaking into a microphone that may be part of the computer system 101, of a cell phone, PDA, tablet, TV, game box, robot or other digital input device 104. If the language spoken is not in the system's native language, the program 110 will invoke the translation engine 208 (see FIGS. 2 and 5) on user command, that services the system. The engine 208 will translate the language into the native language of the user by representing text, voice, or a combination of the two. The program 110 will display on the screen or display device 102, the merchandise, including glasses, watches, clothing, etc., as digital data/images. The images can be in the format of 2D, 3D, 4D, 5D, hologram, or other image format. The merchandise or goods will be displayed on the display 102 either in a real world, virtual world, and/or combination virtual/real environment. In a virtual environment, the user will be able to walk down the street and view stores and shops, and enter into a particular store to view the merchandise, locate the store and/or merchandise via GPS, or have the images of the merchandise sent to their own store location for viewing, trying on (if it is clothing, footwear, or other products, etc.) either virtually, or on an avatar, or physically in the real world, before purchasing the merchandise.

If an avatar is not used, in order to determine the size of the person who is purchasing the goods, or for another individual, the user is photographed, video-taped, or screened by an image capturing device 600 to obtain the measurements of the user/individual from all angles using algorithms, calculations, and/or mapping etc., which determine the individual's size. The individual could be using an image capturing mirror, screen, camera, video camera, image capturing device, cell phone or other device 104/600 that captures images. The image can be converted by the program 110 into a real-life avatar, or an existing avatar on the system can be invoked, and will be mapped with the user's measurements. The system 101 stores the data in a storage device 205 or location that is either in a dedicated computer system 101, in a disk drive, on the internet, or wherever the individual chooses to save the image for future use, or can transfer, teleport, email, or text the file to a store of choice, individual, or company. Captured images are converted by the program 110 of the present invention, in an application environment, and catalogued into a database 205, content management system or a library, or other type of environment for future use. The user may also enter their measurements into an application either via voice, text, touch or some method of selection and save the information in a storage device 205 for further use.

In one embodiment, the user may capture their image using an image capturing device 600 and obtain their measurements at that moment in time, and map those measurements to clothing in their personal closet(s), drawer (s), at home etc. For example, the individual's body may swell throughout the day and certain clothes will not fit properly. The user may send a request to the program 110 of the inventory system 1200 to search their closet, or their virtual closet (if uploaded into storage 205), and request a catalog of images with their location (i.e., particular drawers, closets, etc.), to determine what will fit appropriately on that given day. This is accomplished via the input device 104, phone, tablet, PDA, etc. The information on the items found by the program 110 is sent to the thematic environment 201 requesting a search through a local database 205 of the individual's closet and all the goods, merchandise, footwear etc. that is in the closet, presenting the images back to the user on the display 102 with a GPS or other technology location signal, information.

In one embodiment, the user may send their captured image measurements, or avatar, to a designer or manufacturer to create a specific pattern with their exact measurements for "clothing on demand", "goods on demand", "merchandise on demand", "footwear on demand" etc. A digital copy with the user's measurements, avatar with measurements, and/or all measurements that have been mapped by the image capturing device 600 or the actual mapped measurements, can be sent directly to the designer/manufacturer to develop a pattern that is sent back to the individual for approval, and payment via the billing and accounting functions of the engine 202, through an application, text, video email, social network or other method. Upon approval, the pattern is cut, sewn/manufactured/produced and marked with an ID/code specific to that individual (and may be uploaded into the user's personal inventory system). The merchandise is then shipped to the individual, with the tracking and monitoring function of the inventory system 1200 keeping track of the item.

In one embodiment, the program 110 can provide a virtual environment for the user to try on clothing. To accomplish this transfer/conversion, a holographic representation of the person is projected by the program 110 by selecting the hologram version of themselves from a input device 104, hand held device, wand type of device, command (either voice or typed), brain/mind control system, eyeglass, watch, virtual closet 1350, or some other device etc., used to make this selection. The program 110 will access the images of the stored merchandise, and rasterize the clothing into a holographic form to be mapped over the holographic image of the user. The measurements and size of the hologram will match that of the individual to obtain the correct merchandise size. The images of the merchandise taken from either the inventory section of the store and/or storage area, are sent to the QIE engine 203 by the program 110 for further processing, and sent by the program 110 to the appropriate display 102 for the user review.

In one embodiment, a third party or third party vendor will use their own imaging capture equipment 600 to capture their images, a digital mirror 1350 that contains a minimum of one type of image capturing image device 600, or enter their measurements into a computer system 101 application either via a cell phone, 104 voice, menu, typed, touch or other immersive type device, to calculate the size, process and rasterize the images into the proper format, and either maintain them in their own storage location, and/or transferring/transmitting/teleporting the files to a store or environment of their choice, internet cloud, or portable device for the application/game for use. The device allows the user to also have the selections shown in FIG. 21—i.e., go to computer/internet 1353, voice activate 1354, camera mode 1355, video capture mode 1356, input capture mode 1357, go to store 1358, go to mall 1359, go to street view 1360, and go to TV 1361, etc. Each of the selections 1353-1361 will send a signal to GUI 200 and the thematic application 201 (see FIG. 16) for processing. The data is then transmitted to the QIE engine 203 for further processing, and if required, for the program 110 to transmit the information/data to the appropriate or respective services, client, software, applications, database, hardware, etc.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of providing a user with access to an inventory of merchandise in a plurality of sizes, said merchandise having a design, the method comprising:
   storing a digital design file containing the design in a database of a computer system;
   developing a digital pattern file based on the digital design file using a processor of said computer system;
   storing the digital pattern file in said database of said computer system;
   cutting a material using a cutting device in accordance with said digital pattern file, to form a pattern-cut material;
   capturing one or more images of the pattern-cut material using an image capturing system and storing said captured images in said database;
   obtaining cut material measurements of the pattern-cut material from said cutting device and storing said cut material measurements in said database;
   embedding a unique identification tag into the pattern-cut material using an embedding device;
   associating said captured images, said cut material measurements, and said unique identification tag with one another in said database using said processor; and
   receiving and storing into said database, digital measurements relevant to said merchandise, said digital measurements being captured by sensors which provide said digital measurements of a body of the user;
   searching said database, using said processor, for said pattern-cut material having said cut material measurements approximating user digital measurements toward outputting said unique identification tag;
   locating said pattern-cut material using said outputted unique identification tag; and
   manufacturing said merchandise in accordance with said digital pattern file using said located pattern-cut material.

2. A method of implementing an inventory management system comprising:
   storing a design created by a user and a pattern developed from said design in at least one computer system having at least one data storage;
   cutting a material into said pattern using a cutting device, based on said design created by said user;
   capturing images of said material using at least one scanning and/or image capturing device, as said material is cut into said pattern by said cutting device, to form a piece of merchandise;
   storing said captured images of said cut material in said at least one data storage;

analyzing said captured images for pattern information and measurements using a processor of said at least one computer system;

sending said captured images, pattern information and measurements, using said processor, to a manufacturing system for manufacture and processing;

manufacturing said piece of merchandise according to said pattern information and said measurements;

embedding a unique identification into said merchandise using an embedding device, during manufacturing and processing;

capturing images of said processed piece of merchandise with said embedded unique identification using said scanning and/or image capturing system;

tagging said processed piece of merchandise using a tagging system, for tracking in the inventory management system.

3. The method of claim 2, further comprising:

utilizing a robotic arm to pick up each said piece of merchandise and place each said piece of merchandise on a conveyor belt;

scanning, using a measuring wand, said merchandise, and collecting information on said merchandise, including measurements of said merchandise and said embedded unique identification; and moving said merchandise to a container using another robotic arm, after said embedding device embeds said unique identification.

4. The method of claim 2, wherein said embedding device includes one of an RFID chip embedding device, an ink embedding device, a label device, or a specialty thread embedding device.

5. The method of claim 2, wherein when said merchandise is soft goods, further comprising:

flattening said merchandise using a puffing vent or blower.

6. The method of claim 2, wherein managing the merchandise includes at least one of a ticket creation system for said merchandise, a mark up/down system for said merchandise, a barter system of said merchandise for customers, a polling system to check inventory, an auction system for said merchandise, a retail training application merchandising system, a security system for said merchandise, and a billing system for said merchandise.

* * * * *